United States Patent
Ueyama

(10) Patent No.: US 10,915,419 B2
(45) Date of Patent: Feb. 9, 2021

(54) INDUSTRIAL CONTROL SYSTEM, AND ASSISTANCE APPARATUS, CONTROL ASSIST METHOD, AND PROGRAM THEREOF

(71) Applicant: OMRON Corporation, Kyoto (JP)

(72) Inventor: Yuki Ueyama, Kyoto (JP)

(73) Assignee: OMRON CORPORATION, Kyoto (JP)

(*) Notice: Subject to any disclaimer, the term of this patent is extended or adjusted under 35 U.S.C. 154(b) by 184 days.

(21) Appl. No.: 16/164,010

(22) Filed: Oct. 18, 2018

(65) Prior Publication Data

US 2019/0188110 A1 Jun. 20, 2019

(30) Foreign Application Priority Data

Dec. 15, 2017 (JP) ................................ 2017-240543

(51) Int. Cl.
| | |
|---|---|
| *G06F 9/44* | (2018.01) |
| *G06F 11/34* | (2006.01) |
| *G06F 9/50* | (2006.01) |
| *G05B 23/02* | (2006.01) |
| *G05B 19/042* | (2006.01) |

(52) U.S. Cl.
CPC ...... *G06F 11/3433* (2013.01); *G05B 19/0425* (2013.01); *G05B 23/0221* (2013.01); *G06F 9/505* (2013.01); *G06F 9/5083* (2013.01)

(58) Field of Classification Search
CPC ......... G06F 9/50; G06F 9/505; G06F 11/3433
See application file for complete search history.

(56) References Cited

U.S. PATENT DOCUMENTS

| | | | | |
|---|---|---|---|---|
| 2007/0283358 A1* | 12/2007 | Kasahara | .............. | G06F 9/5044 718/104 |
| 2013/0219402 A1* | 8/2013 | Andrianiaina | ........ | G06F 11/008 718/104 |

(Continued)

FOREIGN PATENT DOCUMENTS

| | | |
|---|---|---|
| JP | 2005-277863 A | 10/2005 |
| JP | 3901417 B2 | 4/2007 |

OTHER PUBLICATIONS

The extended European search report dated May 24, 2019 in a counterpart European patent application.

*Primary Examiner* — Duy Khuong T Nguyen

(74) *Attorney, Agent, or Firm* — Metrolex IP Law Group, PLLC

(57) ABSTRACT

An industrial control apparatus that causes a common processing unit to execute a first execution task for executing processing that does not depend on the number of pieces of data and a second execution task for executing processing that depends on the number of pieces of data, and an assistance apparatus are included. The industrial control apparatus calculates a control load amount of a processing unit incurred by executing the first execution task, and extracts the second execution task from the first and second execution tasks. The assistance apparatus calculates a processing load amount of the processing unit according to the type of the extracted second execution task for the number of pieces of analysis data, and using this processing load amount and the control load amount, calculates a margin of processing that indicates a degree of remaining processing capability of the processing unit.

14 Claims, 12 Drawing Sheets

(56) References Cited

U.S. PATENT DOCUMENTS

2013/0226724 A1* 8/2013 Felch .................... G06Q 30/08
                                                            705/26.3
2014/0366035 A1   12/2014 Yasuda
2015/0089510 A1*  3/2015 Kozakai ................ G06F 9/5077
                                                            718/103
2019/0095247 A1*  3/2019 Shimamura .......... G05B 19/408

* cited by examiner

FIG. 13

| Type of program | Number of pieces of data | Model of control apparatus | | | | | |
|---|---|---|---|---|---|---|---|
| | | A | | | B | | |
| | | 1 | 10 | 100 | 1 | 10 | 100 |
| FB1 | | 1(μ sec) | 1(μ sec) | 1(μ sec) | 2(μ sec) | 2(μ sec) | 2(μ sec) |
| FB2 | | 2(μ sec) | 2(μ sec) | 2(μ sec) | 3(μ sec) | 3(μ sec) | 3(μ sec) |
| FB3 | | 3(μ sec) | 30(μ sec) | 300(μ sec) | 4(μ sec) | 48(μ sec) | 500(μ sec) |
| FB4 | | 4(μ sec) | 40(μ sec) | 500(μ sec) | 5(μ sec) | 59(μ sec) | 600(μ sec) |
| FB5 | | 5(μ sec) | 5(μ sec) | 5(μ sec) | 6(μ sec) | 6(μ sec) | 6(μ sec) |
| FB6 | | 6(μ sec) | 6(μ sec) | 6(μ sec) | 7(μ sec) | 7(μ sec) | 7(μ sec) |

INDUSTRIAL CONTROL SYSTEM, AND ASSISTANCE APPARATUS, CONTROL ASSIST METHOD, AND PROGRAM THEREOF

CROSS-REFERENCES TO RELATED APPLICATIONS

This application claims priority to Japanese Patent Application No. 2017-240543 filed Dec. 15, 2017, the entire contents of which are incorporated herein by reference.

FIELD

The disclosure relates to an industrial control system used to control a manufacturing line or a manufacturing device, for example, and an assistance apparatus, a control assist method, and a program that are used in the system.

BACKGROUND

Commonly, manufacturing lines for manufacturing products through flow production in a plurality of processes have a configuration in which an industrial control apparatus called a programmable logic controller (PLC), an industrial personal computer (IPC), or the like is provided for each manufacturing device arranged for the respective processes, and an operation of each manufacturing device is controlled by the corresponding industrial control apparatus. The industrial control apparatuses periodically execute high-speed and accurate processing on the manufacturing device to be controlled.

In addition, in recent years, providing, to industrial control apparatuses, additional information processing functions other than a function for controlling a manufacturing device has been suggested. The additional information processing function may be a function for monitoring behaviors of a manufacturing device by collecting data related to operations of the manufacturing device and analyzing the collected data, for example. By adding this type of functionality to an industrial control apparatus, it is possible to detect abnormalities and the like of a manufacturing device in real time, and take measures so as to stop the manufacturing device or the manufacturing line, for example. In this case, if such an abnormality or the like is erroneously detected, the production efficiency decreases due to the stopped manufacturing line or the like. Therefore, when performing the above-described detection of abnormalities and the like, it is necessary to collect a large number of pieces of data.

On the other hand, industrial control apparatuses essentially aim to safely and reliably operate manufacturing lines. For this reason, it is required to set and execute tasks in a state where a certain margin (a remaining time of a control cycle) is kept for the industrial control apparatuses. In view of this, conventionally, it has been proposed to calculate a margin by individually calculating processing times of execution tasks that are set and integrating the results, for example in Japanese Patent No. 3901417.

Japanese Patent No. 3901417 is an example of background art.

However, in the technique described in Japanese Patent No. 3901417, it has been possible to appreciate the processing times of all of the execution tasks that have been set, in other words, processing times of all of the tasks that include tasks that depend on and do not depend on the number of pieces of data, but it has been difficult to understand how the margin changes depending on the number of pieces of analysis data.

SUMMARY

One or more aspects have been made with a focus on the above-described situation, and aims to provide an industrial control system that can secure a number of pieces of data required for analysis while reliably operating an industrial control apparatus by setting a higher number of pieces of data within the range of a margin of processing that is allowable for the apparatus and thereby securing a control time, as well as an assistance apparatus, a control assist method, and a program of the industrial control system.

In order to solve the above-described issue, a first aspect of an industrial control system includes an industrial control apparatus and an assistance apparatus. The industrial control apparatus includes a processor (such as a central processing unit (CPU), etc.) configured with a program to perform operations as units of the industrial control apparatus, a common processing unit that executes a first execution task for executing processing for controlling an operation of a control target and a second execution task for executing processing for acquiring analysis data related to the operation of the control target, and analyzing the operation, a first calculation unit that calculates a control load amount of the processing unit incurred by executing the first execution task, and an extraction unit that extracts the second execution task from the first and second execution tasks. The assistance apparatus includes a processor (such as a central processing unit (CPU), etc.) configured with a program to perform operations as units of the assistance apparatus, an acquisition unit that acquires, from the industrial control apparatus, information indicating the calculated control load amount and a type of the extracted second execution task, a second calculation unit that calculates a processing load amount of the processing unit for different numbers of pieces of the analysis data according to the acquired type of the second execution task, a margin calculation unit that calculates, based on information indicating the acquired control load amount and the calculated processing load amount, for each of the different numbers of pieces of the analysis data, a margin of processing that indicates a degree of processing capability that remains when the processing unit executes the first and second execution tasks, and an output control unit that outputs information indicating the calculated margin of processing.

According to a first aspect of the industrial control system, only the second execution task that depends on the number of pieces of analysis data is extracted from execution tasks that are executed by the industrial control apparatus, and, in the assistance apparatus, a processing load amount is calculated according to the type of the extracted second execution task for different numbers of pieces of analysis data. A margin of processing of the processing unit of the industrial control apparatus is then obtained based on this calculated processing load amount and a control load amount that is incurred by executing the first execution task that does not depend on the number of pieces of analysis data.

Accordingly, even if a processing time for different numbers of pieces of analysis data differs according to the type of the second execution task, it is possible to calculate a processing load amount that is based on the number of pieces of analysis data for each type of the second execution task. Therefore, the administrator of the industrial control apparatus can appreciate a margin of processing of the industrial control apparatus that is based on the type of an analysis program for executing the second execution task and the number of pieces of analysis data, and this makes it possible to set an execution rule of the industrial control apparatus so as to acquire a larger number of pieces of analysis data within an allowable margin, and cause the industrial control apparatus to execute analysis processing of the data. Therefore, the industrial control apparatus can acquire as much analysis data as possible within the range of an allowable margin, and can thereby more accurately perform analysis processing of an operation of the control target.

Accordingly, it is possible to secure the number of pieces of data required for analysis while reliably operating the industrial control apparatus by securing a control time.

In a second aspect of the industrial control system, in a case where at least a portion of a plurality of programs prepared for executing the first and second execution tasks is coded in functional blocks, the extraction unit extracts the second execution task by determining whether or not a program for executing the first and second execution tasks corresponds to a predetermined functional block.

According to a second aspect of the industrial control system, it is possible to extract an execution task that depends on the number of pieces of data by determining, every time an execution task is executed, whether or not at least a portion of a program for executing the execution task corresponds to a predetermined functional block, and accordingly, it is possible to extract an execution task that depends on the number of pieces of data without adding, to each program, additional information for identifying the type of the execution task.

In a third aspect of the industrial control system, in a case where a plurality of programs prepared for executing the first and second execution tasks are stored separately in a first storage region associated with the first execution task and a second storage region associated with the second execution task, the extraction unit extracts the second execution task by determining whether a program for executing the execution tasks is stored in the first or second storage region.

According to a third aspect of the industrial control system, by determining, every time an execution task is executed, whether a program for executing the execution task is stored in the first or second storage region, it is possible to extract an execution task that depends on the number of pieces of data, and accordingly, it is possible to extract an execution task that depends on the number of pieces of data without adding, to each program, additional information for identifying the type of the execution task, and without storing programs in functional blocks according to the type of the program.

A first aspect of an assistance apparatus is used with an industrial control apparatus that performs processing for causing a common processing unit to execute a first execution task for executing processing for controlling an operation of a control target and a second execution task for executing processing for acquiring analysis data related to the operation of the control target, and analyzing the operation, in accordance with an execution rule that is set in advance, processing for calculating a control load amount of the processing unit incurred by executing the first execution task, and processing for extracting the second execution task from the first and second execution tasks, and includes an acquisition unit that acquires, from the industrial control apparatus, information indicating the calculated control load amount and a type of the extracted second execution task, a calculation unit that calculates a processing load amount of the processing unit according to the acquired type of the second execution task for different numbers of pieces of the analysis data, a margin calculation unit that calculates, based on information indicating the acquired control load amount and the calculated processing load amount, for each of the different numbers of pieces of the analysis data, a margin of processing that indicates a degree of processing capability that remains when the processing unit executes the first and second execution tasks, and an output control unit that outputs information indicating the calculated margin.

According to a first aspect of the assistance apparatus, a processing load amount is calculated according to the type of the second execution task for different numbers of pieces of data, based on information that indicates the type of the second execution task and has been extracted from the industrial control apparatus, and a margin of processing of the processing unit of the industrial control apparatus is calculated for different numbers of pieces of analysis data, from this processing load amount according to the type of the second execution task for the number of pieces of data and a control load amount that is incurred by executing a first execution task. Thus, the administrator can set the maximum processing data amount within the range of the calculated margin, for the second execution task that depends on the number of pieces of analysis data.

In a second aspect of the assistance apparatus, the calculation unit calculates a processing load amount of the second execution task for different numbers of pieces of analysis data according to each type of the extracted second execution task, from the number of pieces of the analysis data and a processing time for different numbers of pieces of the analysis data.

Therefore, a processing load amount incurred by executing an execution task that depends on the number of pieces of analysis data can be calculated for different numbers of pieces of the analysis data, from a processing time according to the type of the second execution task for different numbers of pieces of the analysis data.

A third aspect of the assistance apparatus further includes a processor (such as a central processing unit (CPU), etc.) configured with a program to perform operations as units of the assistance apparatus, a relationship information generation unit that generates relationship information indicating, as an arithmetic function of the number of pieces of analysis data that is acquired in the second execution task, a relationship between the calculated margin of processing and accuracy indicating a probability that a purpose of the second execution task is achieved when the processing unit of the industrial assistance apparatus executes the second execution task, and the output control unit outputs the generated relationship information as information that can be displayed.

According to a third aspect of the assistance apparatus, relationship information that indicates, as an arithmetic function of the number of pieces of data that is processed in the second execution task, the relationship between the margin of processing and accuracy indicating a probability that a purpose of the second execution task will be achieved when the processing unit of the industrial assistance apparatus executes the second execution task is automatically generated, and this generated relationship information is output as information that can be displayed. Thus, the above-described relationship information allows the administrator to check the relationship between the margin of processing in the industrial control apparatus and processing accuracy of data, and based on this relationship, it is possible to set an execution rule appropriate for the industrial control apparatus performing data processing in the second execution task.

In a fourth aspect of the assistance apparatus, the relationship information generation unit includes a first memory table that stores information indicating a margin of processing in each of a plurality of industrial control apparatuses of different models, a second memory table that stores information indicating a processing load amount in each of a plurality of second execution tasks having different processing algorithms, and a generation processing unit that generates the relationship information for all of the combinations of the plurality of industrial control apparatuses and the plurality of second execution tasks, based on information stored in the first and second memory tables, and the output control unit selects relationship information that satisfies a condition that is set in advance, from generated the plurality of pieces of relationship information, and outputs the selected relationship information as information that can be displayed.

According to a fourth aspect of the assistance apparatus, relationship information is generated for all of the combinations of a plurality of industrial control apparatuses and a plurality of data processing algorithms that are expected to be used, and furthermore, when displaying relationship information, relationship information that satisfies a condition that has been set in advance is selected from the plurality of pieces of relationship information that have been generated, and is displayed. Thus, the operator can select an optimum combination of a plurality of industrial control apparatuses and data processing algorithms that are expected to be used, and set an execution rule of the second execution task.

A fifth aspect of the assistance apparatus further includes a processor (such as a CPU) configured with a program to perform operations as units of the assistance apparatus, a recommended value generation unit that generates a recommended value of the execution rule of the second execution task corresponding to an operation condition indicating degrees of priority of the first execution task and the second execution task, based on the generated relationship information and the operation condition, and the output control unit outputs the generated recommended value of the execution rule as information that can be displayed.

According to a fifth aspect of the assistance apparatus, a recommended value of an execution rule of a second execution task corresponding to an operation condition of the industrial control apparatus is generated based on generated relationship information and the operation condition, and is output as information that can be displayed. Thus, the administrator can set the execution rule of the second execution task by referring to the recommended value of the execution rule that is displayed. Thus, it is possible to precisely and efficiently set the execution rule of the second execution task without requiring skill.

A sixth aspect of the assistance apparatus further includes a processor (such as a CPU) configured with a program to perform operations as units of the assistance apparatus, a determined value generation unit that generates a determined value of the execution rule of the second execution task based on the generated relationship information, and an execution rule setting unit that sets the determined value of the execution rule generated by the determined value generation unit, as the execution rule of the second execution task that is executed by the industrial control apparatus.

According to a sixth aspect of the assistance apparatus, a determined value of the execution rule of the second execution task is generated based on the generated relationship information, and this determined value of the execution rule is set for the industrial control apparatus. Thus, a determined value of an execution rule can be automatically set for the second execution task of the industrial control apparatus, without the administrator particularly performing a setting operation.

In a seventh aspect of the assistance apparatus, the determined value generation unit further executes processing for regenerating the determined value of the execution rule of the second execution task based on the generated relationship information, and the execution rule setting unit further executes processing for updating the execution rule of the second execution task that is executed by the industrial control apparatus, to the determined value of the execution rule regenerated by the determined value generation unit.

According to a seventh aspect of the assistance apparatus, processing for regenerating a determined value of the execution rule of the second execution task is further executed, and the execution rule that is being used by the industrial control apparatus is updated to the analysis rule that has been regenerated. Therefore, for example, even if the control load amount of the first execution task or the processing load amount of the second execution task in the industrial control apparatus has changed from the value of the execution rule that was set before the operation, the execution rule of the second execution task can be automatically re-adjusted. In addition, even if a device such as an actuator is replaced during an operation of the industrial control apparatus and accordingly the device variables change, or the user variables partially change due to the user program being updated or the like, the execution rule of the second execution task can be automatically updated according to these changes.

In an eighth aspect of the assistance apparatus, the execution rule includes information indicating a length of time of a cycle of data to be processed in the second execution task, information indicating a start position of a section to be processed of the data to be processed, and information indicating a range of the section to be processed.

Therefore, the execution rule of the second task can be appropriately set according to periodicity and behaviour of data to be processed.

Accordingly, according to one or more aspects, it is possible to provide an industrial control system that can secure a number of pieces of data required for analysis while reliably operating an apparatus by setting a more number of pieces of data within an allowable margin for a second execution task and thereby securing a control time, as well as an assistance apparatus, a control assist method, and a program of the industrial control system.

BRIEF DESCRIPTION OF THE DRAWINGS

FIG. 13 is a diagram illustrating an example of the relationship between the types of analysis programs that are executed by control apparatuses and processing times for the types of the programs for the number of pieces of data, according to the type of a control apparatus.

DETAILED DESCRIPTION

An embodiment will be described below with reference to the drawings.

Embodiment

Hardware Configuration

Figure 1:
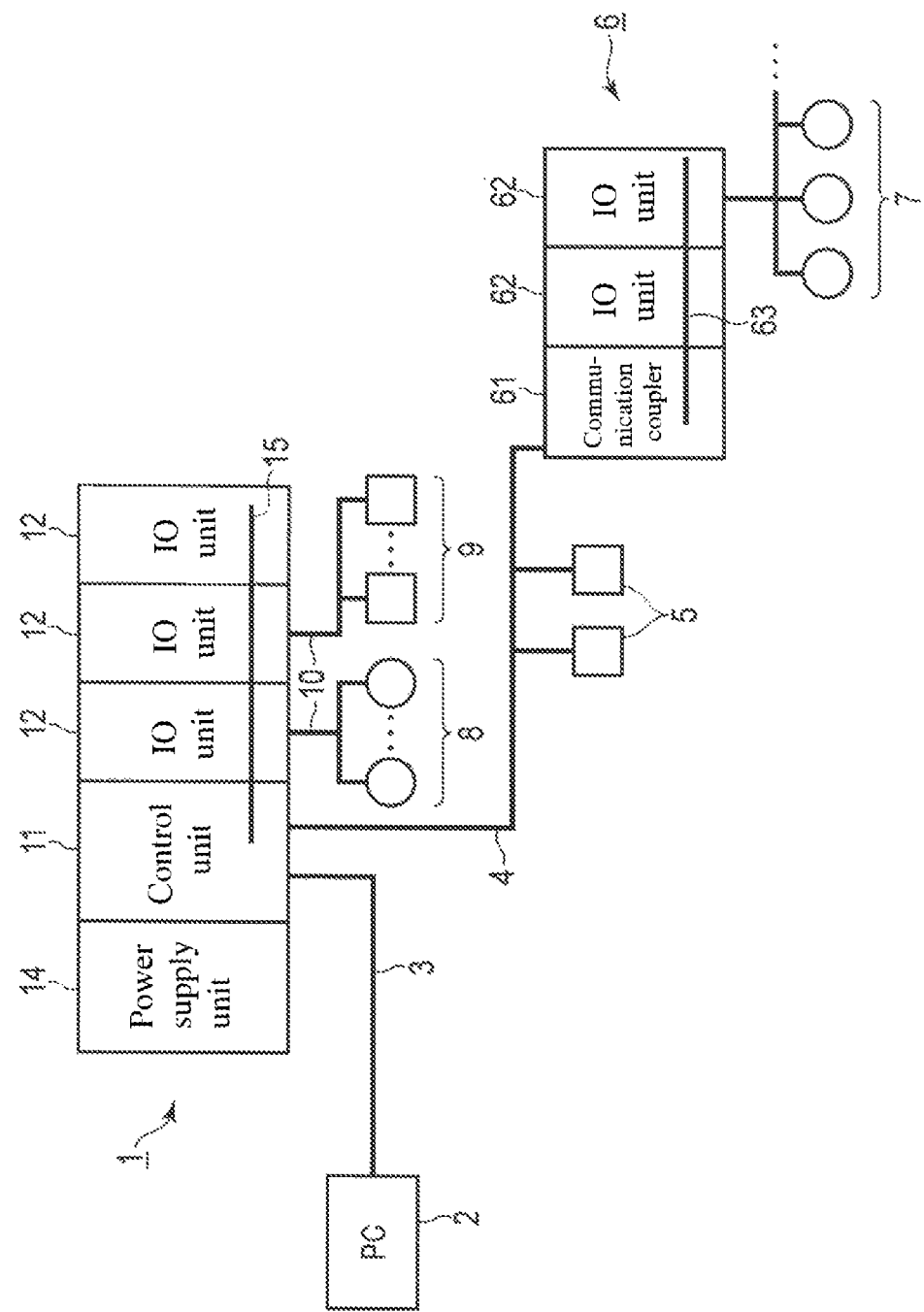
FIG. 1 is a block diagram illustrating the hardware configuration of a manufacturing control system according to an embodiment.

FIG. 1 is a block diagram showing the hardware configuration of a manufacturing control system that is an embodiment of an industrial control system.

This manufacturing control system has an industrial control apparatus (hereinafter, simply referred to as "control apparatus") 1 such as a programmable logic controller (PLC) as a core configuration. The control apparatus 1 has a control unit 11, a plurality of I0 units 12, and a power supply unit 14. The control unit 11 and the plurality of I0 units 12 are connected to each other via a controlling system bus 15 so as to enable mutual data transfer.

Figure 2:
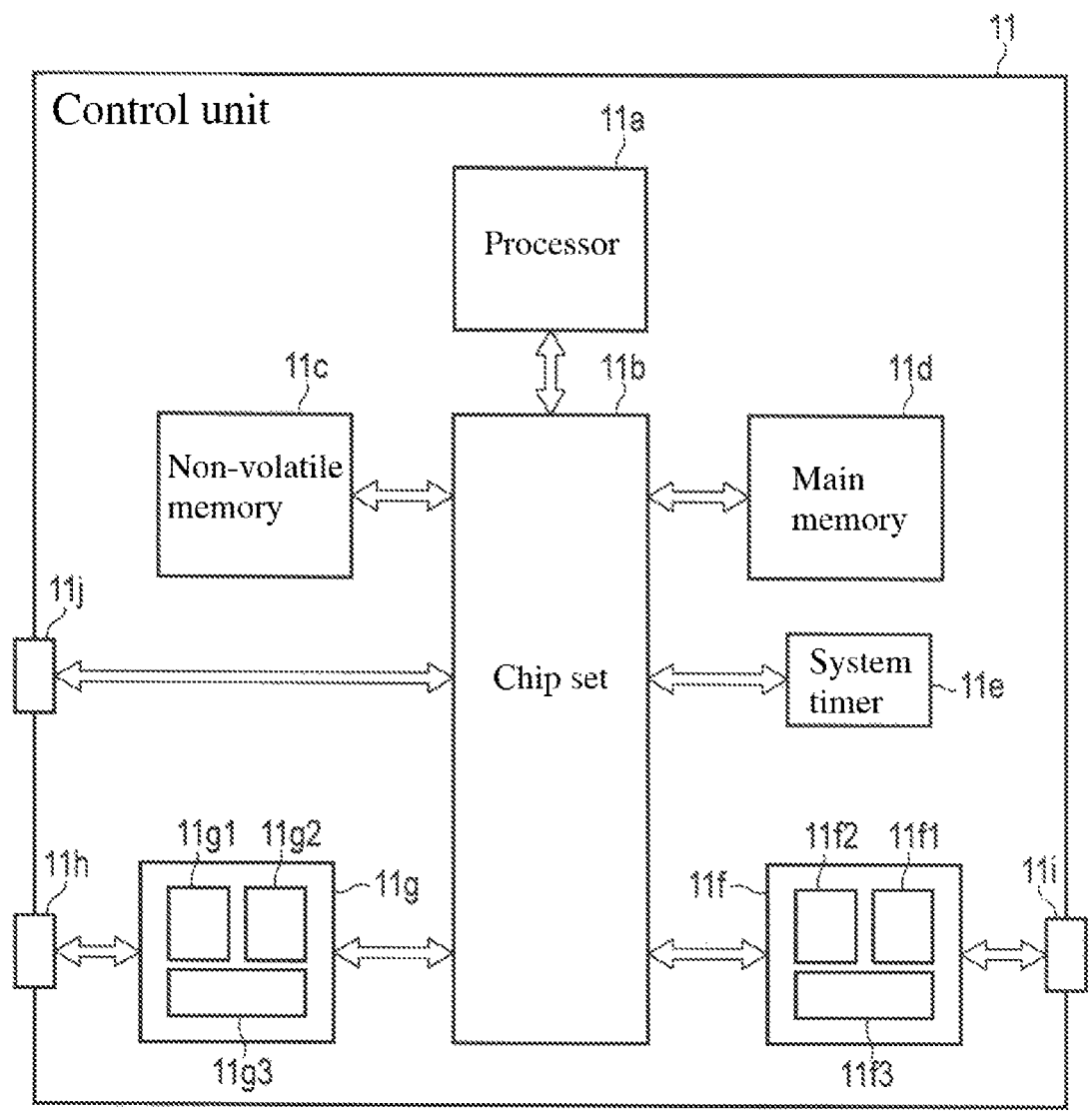
FIG. 2 is a block diagram illustrating the hardware configuration of a CPU unit of an industrial control apparatus in a manufacturing control system, such as in FIG. 1.

FIG. 2 shows the configuration of the control unit 11 of the control apparatus 1. The control unit 11 of the control apparatus 1 has a processor 11a composed of a central processing unit (CPU), a chip set 11b, a non-volatile memory 11c, a main memory 11d, a system timer 11e, a controlling system bus controller 11f, and a field network controller 11g. The controlling system bus controller 11f and the field network controller 11g includes control circuits 11f1 and 11g1, direct memory access (DMA) control circuits 11f2 and 11g2, and buffer memories 11F3 and 11G3, respectively for the controlling system bus and the field network.

Note that reference numerals 11h, 11i, and 11j respectively denote a field network connector, a controlling system bus connector, and a USB connector.

A plurality of actuators 5 and a remote IO terminal 6 are connected to the control unit 11 of the control apparatus 1 via a field network 4. The actuators 5 are arranged in a manufacturing device (not illustrated), and are each constituted by a servo motor and a driver of the servo motor, for example. The actuators 5 operate in accordance with control data that is output from the control unit 11 of the control apparatus 1. Note that, for example, a wired local area network (LAN) such as Ether CAT (registered trademark) is used as the field network 4, but a wireless LAN and Bluetooth (registered trademark) can also be used.

The remote IO terminal 6 has a communication coupler 61 and a plurality of IO units 62, and this communication coupler 61 and the plurality of IO units 62 are connected via a remote IO terminal bus 63. A plurality of sensors 7 are connected to the IO units 62. The sensors 7 include a camera, a temperature sensor, and a vibration sensor, for example. The camera captures an image of a manufacturing device or a work item, and outputs the image data as measured data. The temperature sensor measures the temperature of the manufacturing device, and outputs measured data. The vibration sensor measures vibration of the manufacturing device, and outputs measured data.

After receiving, through the IO units 62, the measured data that has been output from the above-described sensors 7, the remote IO terminal 6 transfers the measured data to the communication coupler 61 via the remote IO terminal bus 63, and transmits the measured data from the communication coupler 61 to the control apparatus 1 via the field network 4.

In addition, a plurality of sensors 8 and a plurality of actuators 9 are connected to the IO units 12 of the control apparatus 1 via a local bus 10. The functions of these sensors 8 and actuators 9 are similar to those of the above-described sensors 7 and actuators 5 connected to the field network 4, and thus a description thereof is omitted.

Incidentally, a personal computer (PC) 2 that functions as an assistance apparatus is connected to the control apparatus 1 via a signal cable 3. For example, a Universal System Bus (USB) cable is used as the signal cable 3. Note that a network such as LAN or wireless LAN can also be used in place of the signal cable 3.

The PC 2 is provided with a control unit that has a central processing unit (CPU), a storage unit that has a non-volatile memory and a main memory, a communication interface unit that performs data transfer to/from the above-described control apparatus 1 via the signal cable 3, and an input/output interface unit. Input devices such as a keyboard, a touch panel, and a mouse, and a display device in which a liquid crystal or organic EL display and the like is used are connected to the input/output interface unit. The input/output interface unit has a graphical user interface (GUI) 210, imports operation data that has been input by an operator through the input device, and outputs, to the display device, display data including graphics or images generated by the control unit so as to display the display data on the screen of the display device.

Software Configuration

Figure 3:
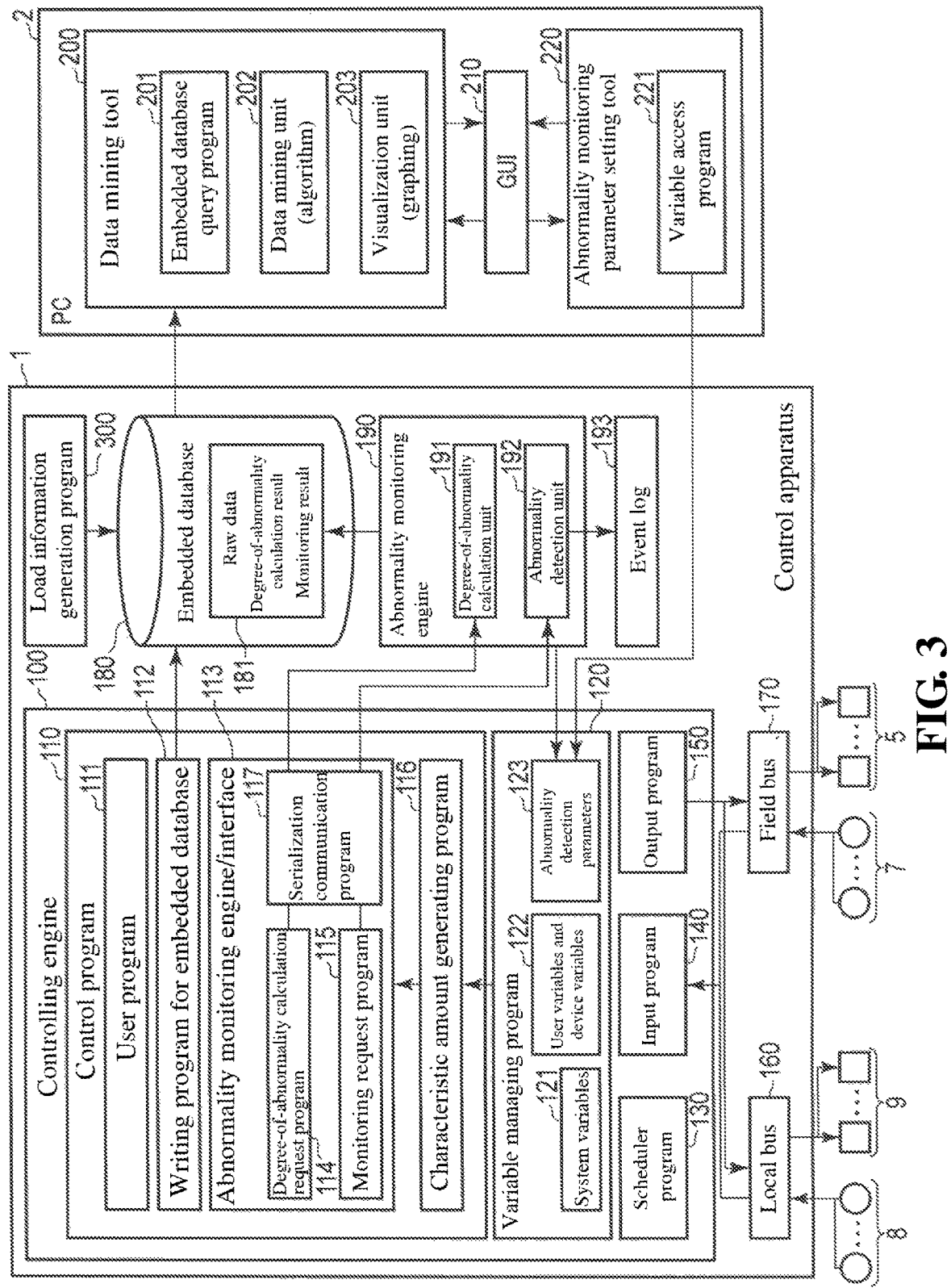
FIG. 3 is a block diagram illustrating the software configuration of an industrial control apparatus and a PC, which is an assistance apparatus, in a manufacturing control system, such as in FIG. 1.
Figure 4:
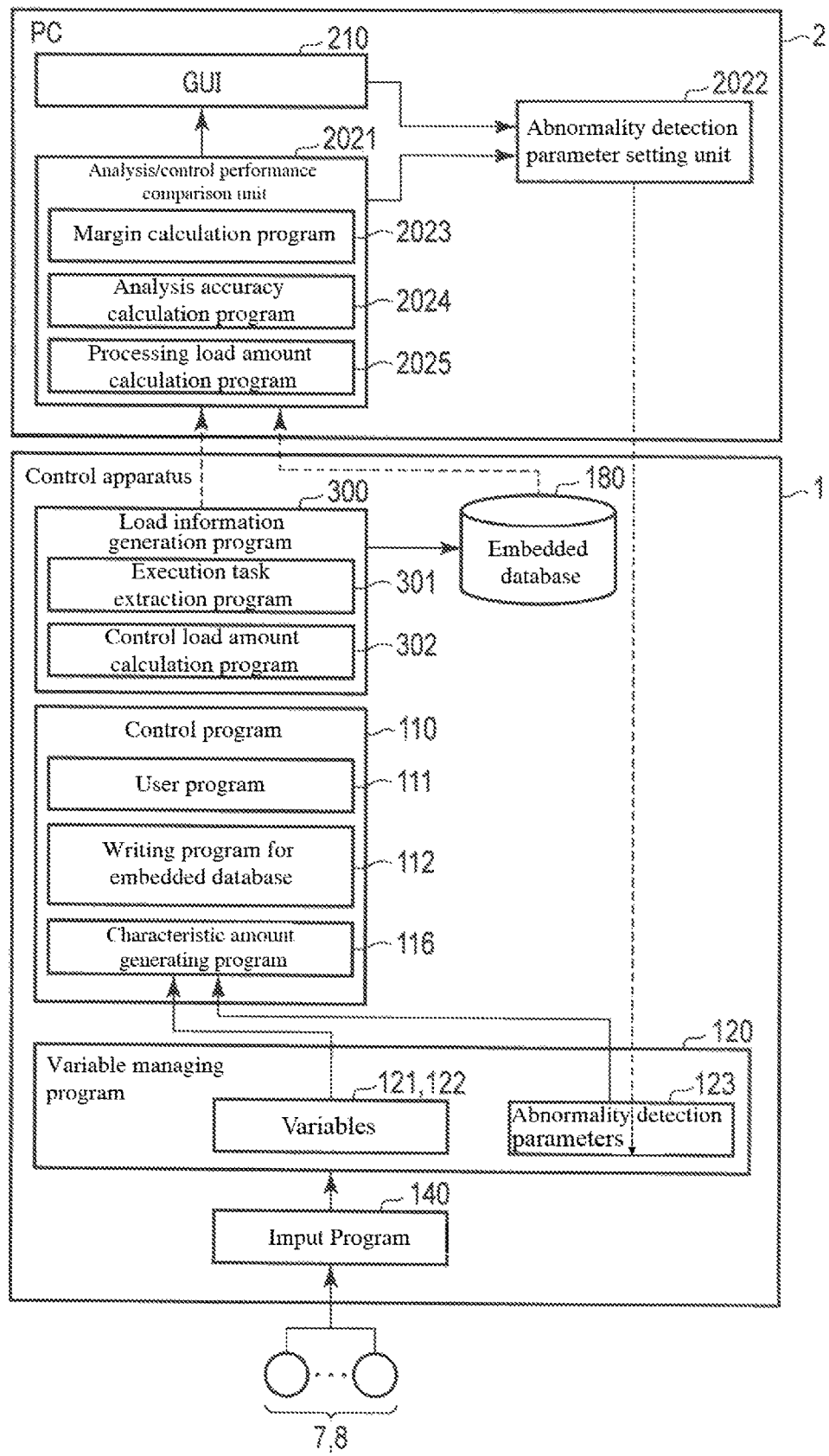
FIG. 4 is a block diagram illustrating the main constituent elements of an industrial control apparatus and a PC, such as in FIG. 3.

FIG. 3 is a block diagram showing the software configuration of the above-described control apparatus 1 and PC 2, and FIG. 4 is a block diagram showing the main constituent elements thereof.

(1) Control Apparatus 1

The control apparatus 1 is constituted by one or more information processing apparatuses that have storage units (e.g., the memories 11c and 11d shown in FIG. 2) that store software programs and data used for executing the software programs and a calculation unit (e.g., the processor 11a shown in FIG. 2) that calls and executes a software program.

Accordingly, the control apparatus 1 has a plurality of function units that include a controlling engine 100, an abnormality monitoring engine 190, and a load information generation program 300. These function units and all of the function units included in these function units are all realized by a hardware processor such as the processor 11a executing a predetermined software program stored in the non-volatile memory 11c. Specifically, each of the function units, namely, the above-described controlling engine 100, abnormality monitoring engine 190, and load information generation program 300 represents predetermined processing that is realized by a software program being executed by the hardware processor.

In addition, the function units, namely the above-described controlling engine 100, abnormality monitoring engine 190, and load information generation program 300 may be configured, individually or in combinations thereof, as an information processing apparatus. Note that the control apparatus 1 may also be constituted by a single information processing apparatus.

Processing functions of the function units of the control apparatus 1 will be described below.

An embedded database 180 is provided in the non-volatile memory 11c. The embedded database 180 is used for storing measured data composed of raw data (waveform data) acquired from the sensors 7 and 8, a learning result, and information indicating an abnormality monitoring result generated by the abnormality monitoring engine 190. In addition, load information of the control apparatus 1 is also stored in the embedded database 180. The load information is generated by the load information generation program 300, and a specific example thereof will be described later.

The controlling engine 100 has a function unit for controlling a manufacturing device (not illustrated) and an analysis processing function unit for monitoring an operation of the manufacturing device and performing abnormality detection, and includes a control program 110, a variable managing program 120, a scheduler program 130, an input program 140, and an output program 150 in order to realize these function units.

The variable managing program 120 manages system variables 121, user variables and device variables 122, and abnormality detection parameters 123. The system variables 121 are variables that indicate the type of the control apparatus 1 and the specification of the control program. The specification is information indicating a processing time of each type of control program compatible with the model of the control apparatus, and, for example, is information indicating a processing capability per unit time for each model of the control apparatus 1 and a processing amount per unit time for each type of control program, and is stored in the non-volatile memory 11c in the control apparatus 1 in association with the model (type) of the control apparatus 1 and the type of control program. User variables are variables (e.g., image, temperature, or vibration acquired by the sensors 7 or 8) related to an operation of a manufacturing device designated by the user. Device variables are variables (e.g., torque of the actuators 5 and 9) related to an operation of a device to be controlled.

The abnormality detection parameters represent an analysis rule for detecting an abnormality of a manufacturing device, and includes a selection rule for designating a time region (time window) when collecting analysis data from the above-described user variables and device variables, and a determination rule for deciding between normality and abnormality based on collected raw data or a characteristic amount generated from the raw data. Note that specific examples of selection rules and determination rules will be described later.

The scheduler program 130 manages resource allocation, execution timing, and the like for a process, a task, and the like that are executed by the control apparatus 1, and thereby a schedule related to manufacturing is managed. The input program 140 performs processing for acquiring measured data that has been output from the sensors 7 and 8, respectively via a local bus 160 and a field bus 170. The output program 150 performs processing for outputting control data generated by the control program 110, to the actuators 5 and 9 via the local bus 160 and the field bus 170.

The control program 110 includes a user program 111, a writing program 112 for the embedded database, an abnormality monitoring engine/interface 113, and a characteristic amount generating program 116.

The user program 111 is a program created in accordance with a manufacturing apparatus or an equipment that is to be controlled, and, for example, is composed of a ladder program created by the user in order to designate an operation procedure of a manufacturing device and the details thereof. The writing program 112 for the embedded database performs processing for writing data to the above-described embedded database 180.

The characteristic amount generating program 116 has processing functions described in (1) and (2) below.

(1) The abnormality detection parameters 123 and measured data corresponding to the user variables and device variables 122 are imported from the above-described variable managing program 120. Subsequently, in accordance with a selection rule represented by the above-described abnormality detection parameters 123, measured data in a section designated in accordance with the above-described selection rule is collected from the above-noted measured data.

Specifically, parameter values indicating a cycle (data collection cycle) for collecting measured data (waveform data), a start position for starting data collection, and a data acquisition range for collection (a time until data collection ends from the above-mentioned start position) are defined as a time window for performing data collection by the selection rule. Data in a section that is designated by the parameter values is then collected from measured waveform data. Note that the selection rule is not limited to these parameter values, and it is also possible to designate a data collection start position and end position for each cycle of waveform data, or various other parameters can also be used.

(2) A characteristic amount of data in a section collected in (1) above is generated in accordance with a characteristic amount generation rule that has been set in advance. Specifically, for example, an average value or maximum value may be defined by the above-noted characteristic amount generation rule, and the average value or maximum value of the above-described analysis data in the section that has been collected may be calculated as a characteristic amount. Note that a correlation or pattern difference between pieces of data or the like may also be used as a characteristic amount, besides the above-noted average value or maximum value.

The abnormality monitoring engine/interface 113 includes a degree-of-abnormality calculation request program 114, a monitoring request program 115, and a serialization communication program 117, and sets, in the abnormality monitoring engine 190, the above-described characteristic amount generated by the characteristic amount generating program 116, along with a learning request and a monitoring request.

The abnormality monitoring engine 190 includes a degree-of-abnormality calculation unit 191 and an abnormality detection unit 192. The degree-of-abnormality calculation unit 191 receives the above-described characteristic amount generated by the characteristic amount generating program 116 from the abnormality monitoring engine/interface 113, performs abnormality monitoring processing for abnormality detection based on the received characteristic amount, and stores the degree-of-abnormality calculation result in the embedded database 180. A technique for calculating a degree-of-abnormality may be selected as appropriate according to an aspect of abnormality monitoring. For example, K-means (nearest neighbour algorithm), One Class SVM, LOF (Local Outlier Factor), Isolation Forest, and the like may be used as a technique for calculating a degree-of-abnormality.

The abnormality detection unit 192 receives the characteristic amount generated by the characteristic amount generating program 116, from the abnormality monitoring engine/interface 113, and performs abnormality monitoring processing on the characteristic amount, based on the degree-of-abnormality calculation result stored in the embedded database 180. The monitoring result is then stored in the embedded database 180, and an event log 193 is generated based on the above-described abnormality monitoring result.

Note that, in normality/abnormality determination in the above-described abnormality monitoring processing, an abnormality determination rule included in the abnormality detection parameters is used. The abnormality determination rule is represented by a threshold value that has been set for each variable in order to perform a determination regarding shape, position, temperature, or vibration, for example.

Accordingly, the abnormality detection unit 192 compares the characteristic amount generated by the characteristic amount generating program 116, for each of the variables defined by the above-described abnormality determination rule, with the corresponding threshold value, and determines, based on the comparison results and the above-described degree-of-abnormality calculation result, whether the operation of the manufacturing device to be monitored is normal or abnormal. Note that an abnormality detection method is not limited to the above-described method, and various other methods are conceivable.

A group of programs related to control of a manufacturing device, from among the control program 110, the variable managing program 120, the scheduler program 130, the input program 140, the output program 150, and programs that constitute the abnormality monitoring engine 190, which have been described above, is simply referred to as a "control program", and, additionally, a group of programs related to processing for collecting data of a manufacturing device to be analyzed and monitoring (detecting) an operation abnormality of the manufacturing device is simply referred to as an "analysis processing program".

The load information generation program 300 includes an execution task extraction program 301 and a control load amount calculation program 302.

The execution task extraction program 301 has a function for extracting a program for executing an execution task (first execution task) that depends on the number of pieces of analysis data, from among all of the programs for realizing a control processing function for controlling a manufacturing device and an analysis processing function for collecting and analyzing the analysis data that indicates the operation state of a manufacturing device, the functions being provided in the control apparatus 1. In an embodiment, an execution task that depends on the number of pieces of data related to analysis processing corresponds to a program (analysis processing program) for realizing the above-described analysis processing function.

Note that, in an embodiment, an execution task (second execution task) that does not depend on the number of pieces of data related to the above-described analysis processing corresponds to a program (control program) for realising the above-described control processing function for controlling a manufacturing device. Note that a specific example of the above-described processing for extracting an analysis processing program will be described later.

In the case where a control program of a manufacturing device is selected by the administrator (operator) of the control apparatus 1, a control load amount calculation program 303 reads out, from the non-volatile memory 11c in the control apparatus 1, a specification corresponding to the model (type) of the control apparatus 1 and the type of the selected control program. The control load amount calculation program 303 then calculates a control load amount of the processor 11a when the control apparatus 1 executes the selected control program, based on this specification, and stores the calculated control load amount in the embedded database 180.

(2) PC 2

Similar to the control apparatus 1 that has been described above, the PC 2 is constituted by one or more information processing apparatuses that have a storage unit that stores a software program and data used for executing the software program and a calculation unit that calls and executes a software program.

Specifically, the PC 2 has a plurality of function units including a data mining tool 200, a graphical user interface (GUI) 210, and an abnormality monitoring parameter setting tool 220. These function units and all of the function units included in these function units are all realized by a hardware processor such as a processor executing a predetermined software program stored in a non-volatile memory. Accordingly, function units of the above-described data mining tool 200, GUI 210, and abnormality monitoring parameter setting tool 220 each indicate predetermined processing that is realized by a hardware processor executing a software program.

In addition, the function units of the data mining tool 200, GUI 210, and abnormality monitoring parameter setting tool 220 may be configured, individually or in combinations thereof, as an information processing apparatus. Note that the control apparatus 1 may be constituted by a single information processing apparatus.

Processing functions of the function units of the PC 2 will be described below.

The GUI 210 has a function for importing operation data that has been input by the operator from the input device, as well as a function for outputting display data including graphics or images generated by the control unit, to the display device, and displaying the display data on the screen of the display device. Note that an input interface other than a GUI can also be used for importing operation data from the input device.

The data mining tool 200 includes, as function units thereof, an embedded database query program 201, a data mining unit 202, and a visualization unit 203.

The embedded database query program 201 includes a program for executing processing as a load information acquisition unit and a program for executing processing as a monitoring result information acquisition unit. The program for executing processing as the load information acquisition unit acquires information indicating the type of an analysis processing program extracted from the embedded database 180 of the control apparatus 1 by the execution task extraction program 301, and load information of the control apparatus 1. The load information includes a control load amount when a manufacturing device is controlled, which is calculated by the above-described load information generation program 300. The program for executing processing as the monitoring result information acquisition unit acquires information indicating a monitoring result from the embedded database 180 of the control apparatus 1.

As shown in FIG. 4, the data mining unit 202 and the visualization unit 203 have a processing load amount calculation program 2025, a margin calculation program 2023, and an analysis accuracy calculation program 2024, as programs for realizing functions according to an embodiment. The data mining unit 202 and the visualization unit 203 execute processing described in (1) to (7) below under the control of the above-described processing load amount calculation program 2025, margin calculation program 2023, and analysis accuracy calculation program 2024. Note that the above-described processing load amount calculation program 2025, margin calculation program 2023, and analysis accuracy calculation program 2024 constitute an analysis/control performance comparison unit 2021.

(1) Calculation of Processing Load Amount of Analyzing Program

The processing load amount calculation program 2025 calculates a processing load amount of the processor 11$a$ when an analysis processing program acquired from the control apparatus 1 by the above-described embedded database query program 201 is executed, for each type of the analysis processing program, based on the number of pieces of data that are processed by the analysis processing program (the number of pieces of processing data). Note that a specific example of processing for calculating a processing load amount that is performed by the above-described analysis processing program will be described later.

(2) Calculation of Margin and Generation of Margin Graph

The margin calculation program 2023 calculates a margin of processing of the processor 11$a$ for the number of pieces of analysis data when the control apparatus 1 executes a control program of a manufacturing device and an analysis processing program for analyzing the operation state of the manufacturing device in parallel, based on a control load amount of the processor 11$a$ when the control program of the manufacturing device is executed, the control load amount having been acquired from the control apparatus 1 by the above-described embedded database query program 201. Display data for displaying the calculation result as a margin graph is then generated.

Note that, as described above, a margin of processing is calculated as a time within a control cycle that remains when the processor 11$a$ of the control apparatus 1 executes a control program and an analysis processing program (remaining time), or a ratio of that time.

The visualization unit 203 displays a margin graph on the screen of the display device through the GUI 210 in accordance with display data of a margin graph generated by the above-described margin calculation program 2023.

(3) Calculation of Data Analysis Accuracy and Generation of Trade-Off Graph

The analysis accuracy calculation program 2024 calculates, based on information indicating a monitoring result acquired by the above-described embedded database query program 201, the accuracy of the monitoring result (data analysis accuracy) for the number of pieces of analysis data when the control apparatus 1 executes the analysis processing program. Display data for displaying a graph (trade-off graph) indicating the relationship between the margin of processing calculated in (2) above and the above-described data analysis accuracy is then generated.

The visualization unit 203 displays a trade-off graph indicating a margin of processing for the number of pieces of analysis data and change in data analysis accuracy, on the screen of the display device through the GUI 210, in accordance with display data of a trade-off graph.

(4) Function for Accepting Manual Setting of Abnormality Detection Parameters

In a function for accepting manual setting, if the operator references the above-described margin graph or trade-off graph that are displayed, and inputs abnormality detection parameters with the input device, the abnormality detection parameters are received from the GUI 210, and is set in the variable managing program 120 of the control apparatus 1.

Note that, as described above, the abnormality detection parameter includes a selection rule for designating a time window for collecting analysis data and a determination rule for deciding between normality and abnormality.

(5) Function for Semi-Automatically Setting Abnormality Detection Parameters

This semi-automatic setting function creates recommended values of the above-described abnormality detection parameter based on the margin of processing of the control apparatus 1 and the data analysis accuracy calculated in (2) and (3) above as well as an operation condition of the control apparatus 1 designated by the operator in advance, and displays the recommended values on the screen of the display device through the GUI 210. When a desired value is designated from the displayed recommended values of the abnormality detection parameter by the operator, the designated value is set as an abnormality detection parameter for the variable managing program 120 of the control apparatus 1. Note that a specific example of the above-described operation condition of the control apparatus 1 will be described later.

(6) Function for Fully Automatically Setting Abnormality Detection Parameters

In this fully automated setting function, an optimum value of the above-described abnormality detection parameter is calculated based on the margin of processing of the control apparatus 1 and the data analysis accuracy calculated in (2) and (3) above as well as a parameter setting condition designated by the operator in advance, and the optimum value is set as a determined value of the abnormality detection parameter in the variable managing program 120 of the control apparatus 1.

(7) Automatic Update Function of Abnormality Detection Parameter

In this automatic update function, after the above-described abnormality detection parameter was set, processing for calculating a margin of processing of the control apparatus 1 and data analysis accuracy is periodically executed in accordance with (2) and (3) above, and an optimum value of the abnormality detection parameter that is set in the control apparatus 1 is updated.

Before operating the control apparatus 1, the data mining unit 202 selectively executes processing of one of (4), (5) and (6) above according to a mode designation made by the operator through the GUI 210. On the other hand, processing (7) above is executed during a period during which control and analysis processing is executed after the control apparatus 1 started to operate.

The abnormality monitoring parameter setting tool 220 has a variable access program 221. The variable access program 221 performs processing for setting an abnormality detection parameter that has been set in processing (4), (5) or (6) above of the data mining unit 202, in the variable managing program 121 of the control apparatus 1.

Operations

Next, processing operations of the control apparatus 1 and the PC 2 configured as described above will be described.

(1) Generation of Margin Graph

Before the control apparatus 1 actually operates, a series of processing for setting an abnormality detection parameter as an analysis rule in the control apparatus 1 is executed.

(1-1) Extraction of Analysis Processing Program

As a technique for extracting an analysis processing program, in an embodiment, the following two working examples will be described.

Working Example 1

Note that, as an analysis processing program, predetermined processes may be collectively coded as functional blocks, or processes may be coded individually, and, in Working Example 1, a technique will be described on the assumption that a program including a functional block in which predetermined processing is collective is used.

Specifically, the above-noted functional blocks may be instructions for designating call and execution of a corresponding library program (or a corresponding code of a library program) when a turn for execution comes. In other words, library programs that are programs that correspond to functional blocks are prepared in advance, and the processor calls a library program as appropriate in accordance with a program, and executes the library program.

Figure 5:
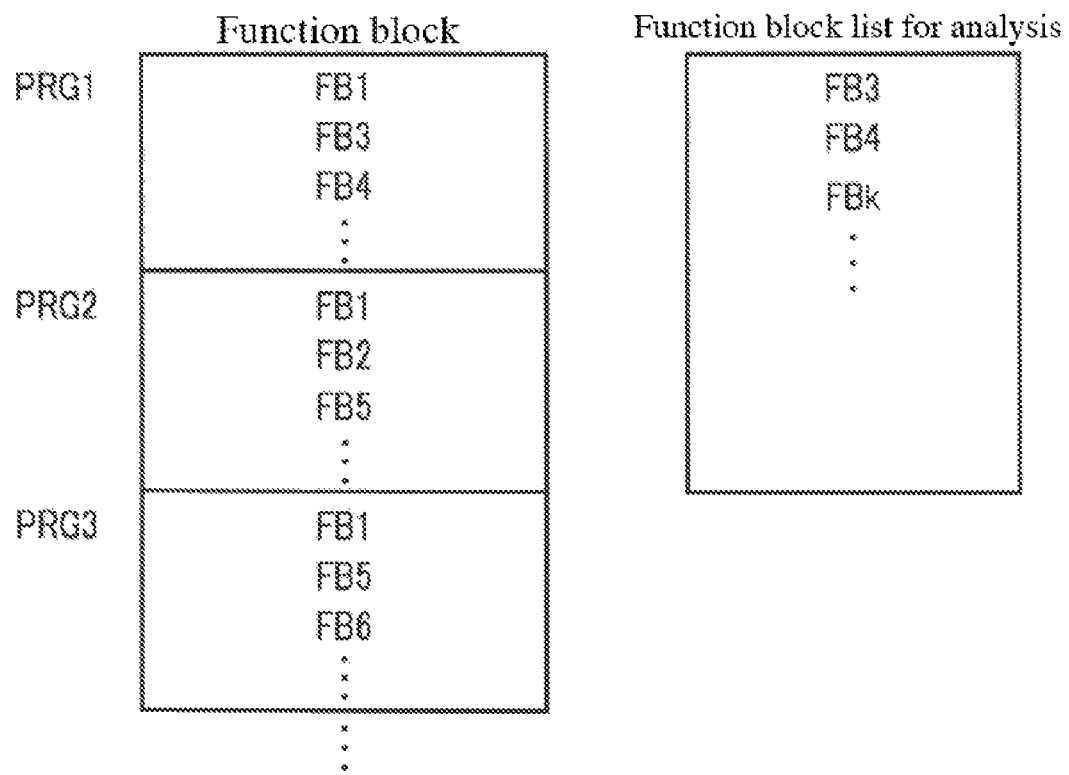
FIG. 5 is a diagram illustrating an example of the configuration of functional blocks for each program and an example of a list of functional blocks for analysis.
Figure 7:
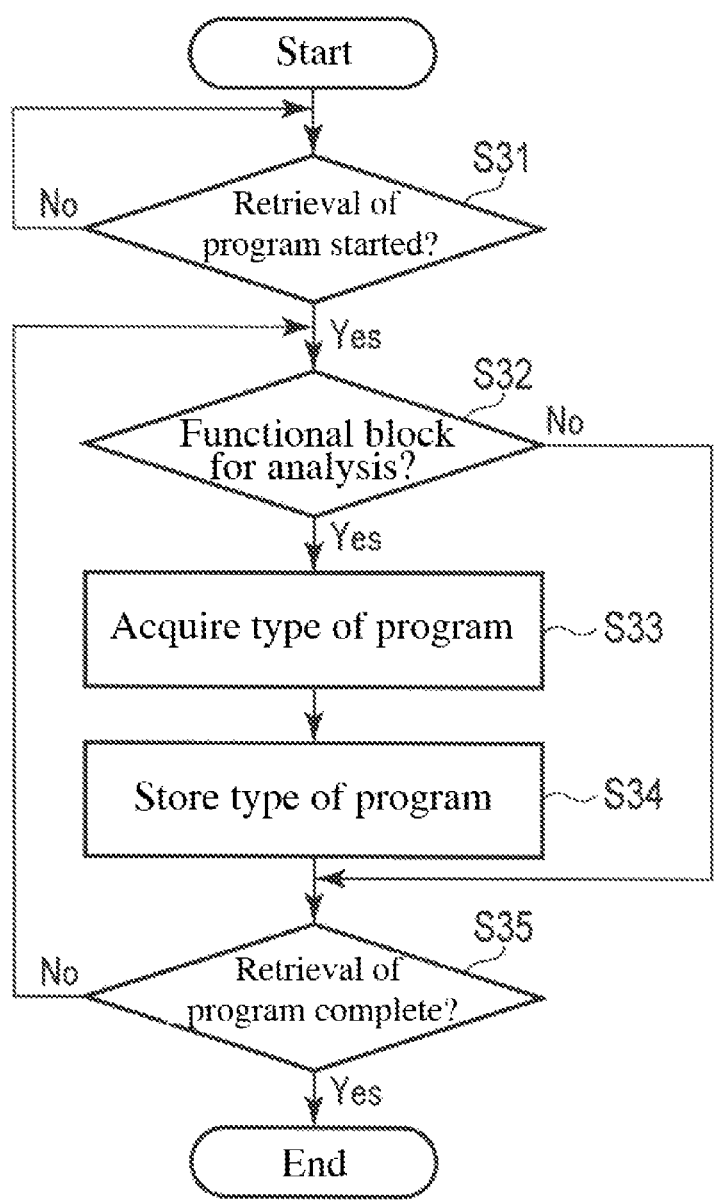
FIG. 7 is a flowchart illustrating Working Example 1 of the procedure and the details of processing for extracting an analysis program that is performed by an industrial control apparatus, such as in FIGS. 3 and 4.

FIG. 7 is a flowchart showing Working Example 1 of processing for extracting an analysis processing program. Programs that are used in the control apparatus 1 are stored separately in a program storage region of the non-volatile memory 11c. FIG. 5 shows an example thereof. A plurality of programs PRG1, PRG2, PRG3, . . . are stored in the program storage region of the non-volatile memory 11c. A plurality of functional blocks FB1, FB3, FB4, . . . , functional blocks FB1, FB2, FB5, . . . , functional blocks FB1, FB5, FB6, . . . are respectively stored in these programs PRG1, PRG2, PRG3, . . . .

For example, programs for executing an analysis processing task include a data collection program for selectively collecting measured data from the sensors 7 and 8 that monitor an operation of a manufacturing device, a data storing program for storing this data collected by the data collection program, in the embedded database 180, a program 116 for generating a characteristic amount from measured data stored in the above-described embedded database 180, in accordance with an analysis rule that is set in the abnormality detection parameters 123, a determination program for deciding between normality and abnormality based on the generated characteristic amount in accordance with a determination rule that has been set for the abnormality detection parameters 123, and the like. These programs are coded as functional blocks prepared for analysis processing.

In addition, a list of functional blocks for analysis is provided in the non-volatile memory 11c. For example, as shown in FIG. 5, identification information of functional blocks FB2, FBi, FBk, . . . that contain programs for executing tasks of the above-described analysis processing is stored in the list of functional blocks for analysis.

When start of retrieval of a program is detected in step S31, the execution task extraction program 301 in the load information generation program 300 retrieves one program first in step S32, references the above-described list of functional blocks for analysis, and determines whether or not the functional blocks contained by the program that has been retrieved are functional blocks for analysis. In the example in FIG. 5, it is determined that the functional blocks FB3 and FB4 of the program PRG1 are functional blocks for analysis.

If it is determined that the functional blocks FB3 and FB4 of the program PRG1 are functional blocks for analysis, the control load amount calculation program 302 acquires, in step S33, the type of the program that was retrieved and the number of pieces of processing data, and, in step S34, stores information indicating the type of the acquired program in the embedded database 180.

Subsequently, the execution task extraction program 301 determines in step S35 whether or not all of the programs have been retrieved, and if there is still a program that has not been retrieved, returns the procedure to step S32, retrieves a program that has not been retrieved, and determines whether or not the functional blocks contained by this program are functional blocks for analysis. If the functional blocks are functional blocks for analysis, the control load amount calculation program 302 acquires information indicating the type of the program in step S33, and stores this acquired information indicating the type in the embedded database 180 in step S34. After this, similarly, until retrieval of all of the programs is complete, processing for extracting an analysis program and processing for storing information indicating the type of the analysis program in the embedded database 180 in the above steps S32 to S35 are repeatedly executed.

Note that, as a technique for extracting an analysis processing program, a technique for extracting a code from a program that is executed, analyzing the code, and thereby understanding the usage condition of the functional blocks is also conceivable. In the case of using a functional block, the format of data is necessarily declared in the name of a functional block for analysis (e.g., a string or an identification flag), and the history thereof is stored. Therefore, the execution task extraction program 301 retrieves all of the functional blocks that have been determined to be functional blocks for analysis, based on the stored usage history. Accordingly, it is possible to extract functional blocks for analysis from all of the programs.

Working Example 2

As an analysis processing program, predetermined processes may be collectively coded as functional blocks, or each process may be coded individually, but in Working Example 2, a technique that can cope with both cases will be described.

Figure 8:
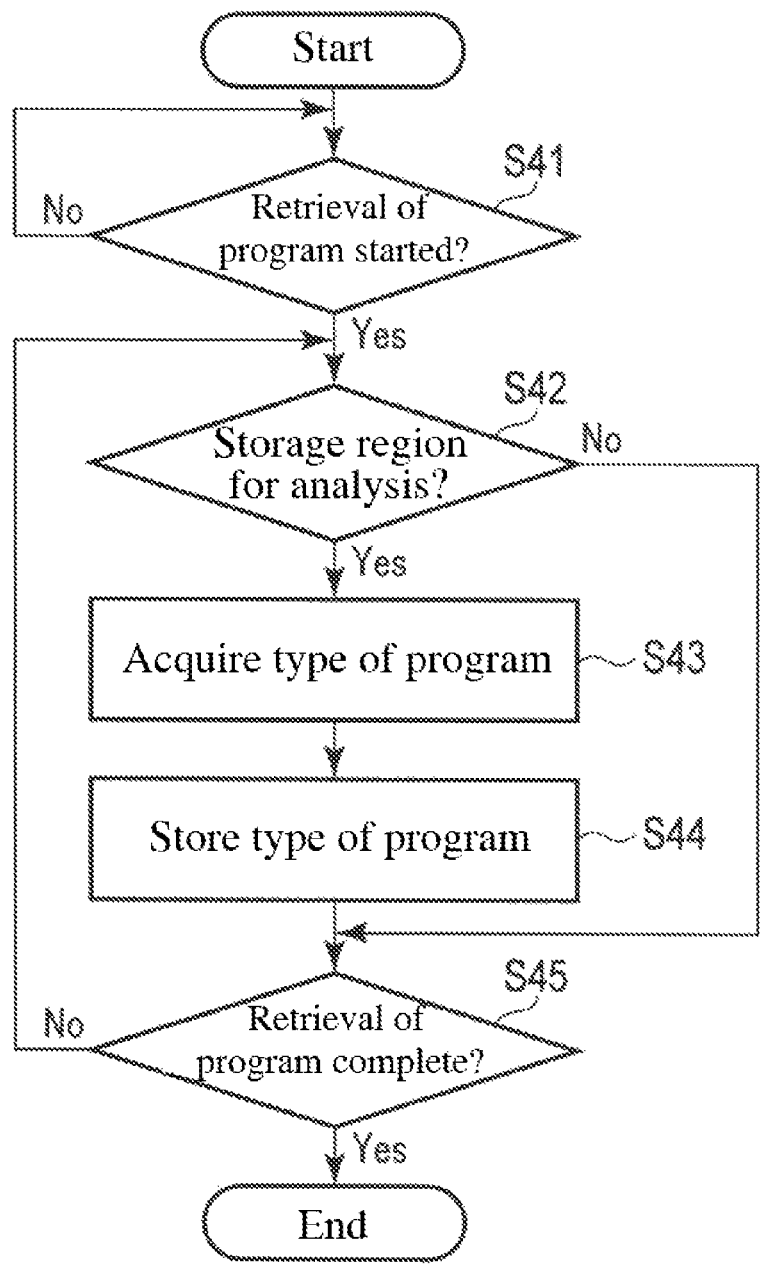
FIG. 8 is a flowchart illustrating Working Example 2 of the procedure and the details of processing for extracting an analysis program that is performed by an industrial control apparatus, such as in FIGS. 3 and 4.

FIG. 8 is a flowchart showing Working Example 2 of a technique for extracting an analysis processing program.

Figure 6:
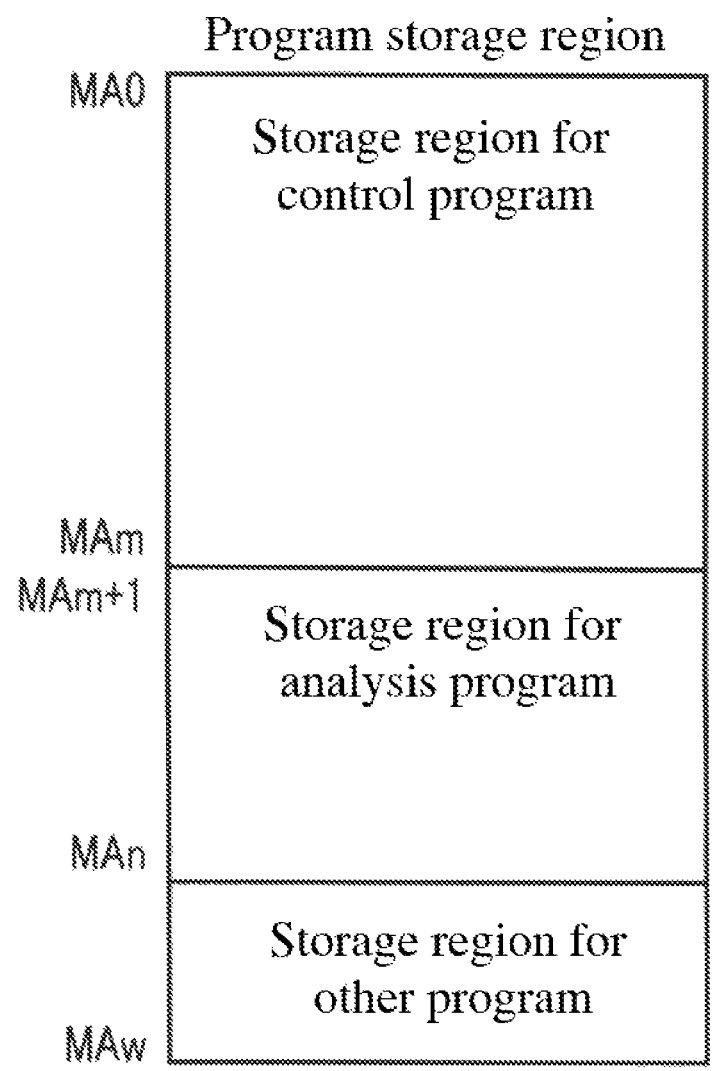
FIG. 6 is a diagram illustrating an example of the configuration of a program storage region.

In the program storage region of the non-volatile memory 11c, for example, as shown in FIG. 6, storage regions (MA0 to MAm) for storing control programs of a manufacturing device, storage regions (MAm+1 to MAn) for storing analysis processing programs, and storage regions (MAn+1 to MAw) for storing other programs are defined in advance. In addition, the programs are stored in these storage regions separately according to their functions.

When start of retrieval of a program is detected in step S41, the execution task extraction program 301 in the load information generation program 300 retrieves a program first in step S42, determines which storage region stores the program, and determines whether or not the storage region is one of the storage regions (MAm+1 to MAn) for storing analysis processing programs. If the storage region is one of the storage regions (MAm+1 to MAn) for storing analysis processing program, the control load amount calculation program 302 acquires information indicating the type of the program retrieved in step S43, and in step S44, stores, in the embedded database 180, the acquired information indicating the type of the analysis processing program.

Subsequently, the execution task extraction program 301 determines in step S45 whether or not the retrieval of all of the programs is complete, and if there is still a program that has not been retrieved, returns the procedure to step S42, retrieves a program that has not been retrieved, and determines whether or not the storage region that contains this program is one of the storage regions (MAm+1 to MAn) for storing analysis processing programs. If the storage region that contains this program is one of the storage regions (MAm+1 to MAn) for storing analysis processing programs, the control load amount calculation program 302 acquires information indicating the type of the program, and stores the information in the embedded database 180, respectively in steps S43 and S44.

After that, similarly, until the retrieval of all of the programs is complete, processing for extracting any analysis program and processing for storing information indicating the type of the analysis program in the embedded database 180 in the above steps S42 to S45 are repeatedly executed.

(1-2) Calculation of Control Load Amount by Program for Controlling Manufacturing Device The control load amount calculation program 303 in the load information generation program 300 selects a program other than the extracted analysis program, and reads out, from the non-volatile memory 11c in the control apparatus 1, the specification corresponding to the model (type) of the control apparatus 1 and the type of the selected control program. A control load amount of the processor 11a when the control apparatus 1 executes the selected control program is calculated based on this specification, and the calculated control load amount is stored in the embedded database 180.

As described above, the specification is information indicating a processing capability per unit time for each model (type) of a control apparatus 1 and a processing amount per unit time for each type of a control program. The control load amount calculation program 303 calculates a control load amount of the processor 11a when controlling a manufacturing device, based on the above-described processing capability per unit time and processing amount per unit time.

(1-3) Acquisition of Information Indicating Load Information, Type of Analysis Processing Program, and Monitoring Result The operator connects the PC 2 to the control apparatus 1 in which control programs are installed.

Figure 9:
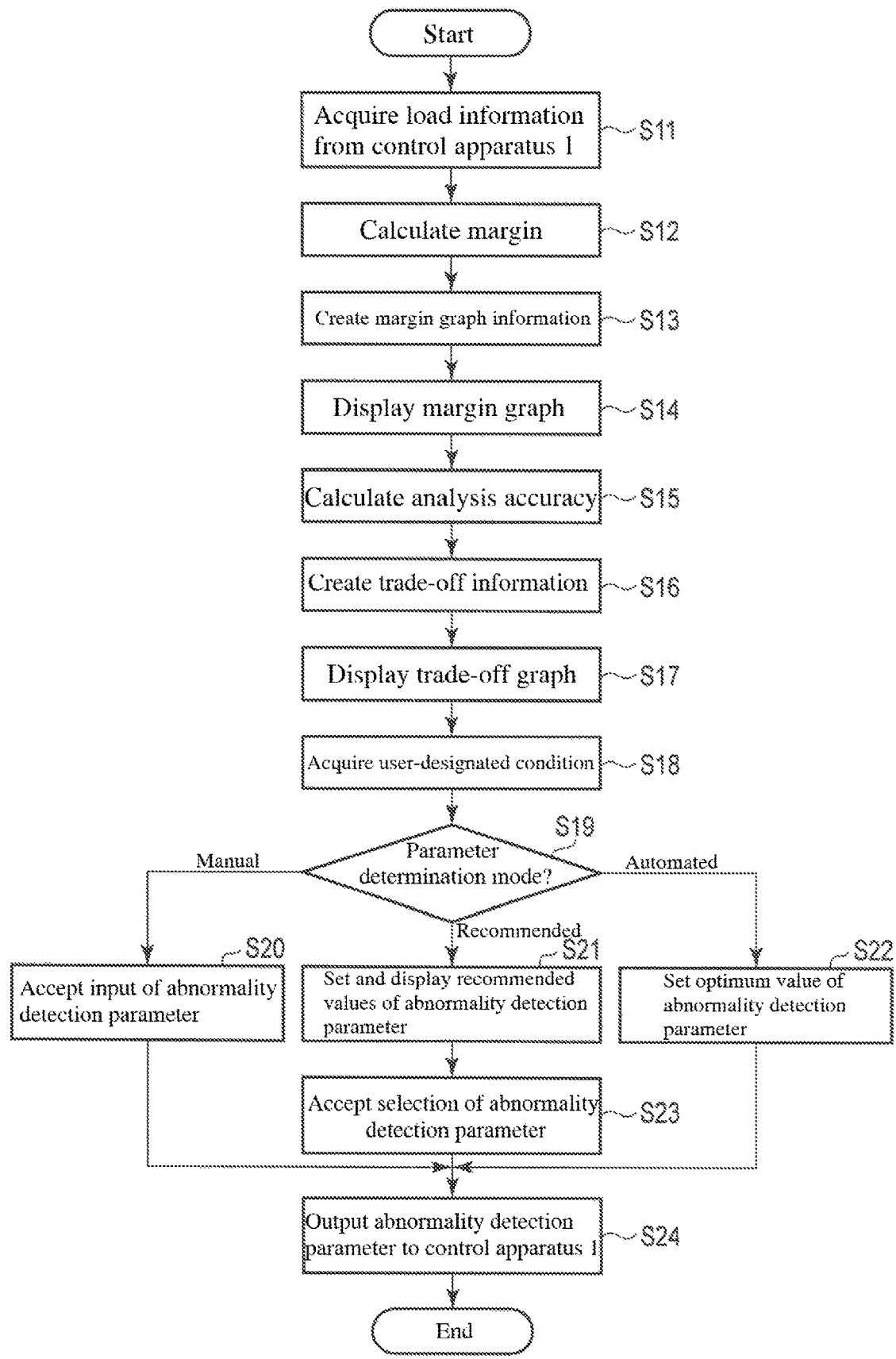
FIG. 9 is a flowchart illustrating the procedure and the details of abnormality detection parameter setting processing that is performed by a PC, such as in FIGS. 3 and 4.

First, in step S11 shown in FIG. 9, the PC 2 imports, from the embedded database 180 of the control apparatus 1, load information and information indicating the type of an analysis program, as shown in FIG. 4, using the embedded database query program 201 under the control of the data mining tool 200. This load information includes information indicating a control load amount of the processor 11a when the control program of the manufacturing device was executed, the information having been generated by the load information generation program 300.

In addition, along with that, the data mining tool 200 imports information indicating a monitoring result, from the embedded database 180 of the control apparatus 1, using the embedded database query program 201.

(1-4) Calculation of Margin and Generation of Margin Graph

Next, in step S12, the data mining tool 200 calculates a margin of processing of the processor 11a for the number of pieces of analysis data when the control apparatus 1 executes an analysis processing program and a control program of a manufacturing device in parallel, based on the control load amount included in the acquired load information and information indicating the type of the analysis program, under the control of the margin calculation program 2023 (illustrated in FIG. 4) provided in the analysis/control performance comparison unit 2021.

(1-4-1) Calculation of Processing Load Amount for Different Number of Pieces of Data Used for Analysis Program A data table indicating the relationship between the type of an analysis program that is executed by the control apparatus 1 and a processing time that is based on the number of pieces of processing data for each type of program is created for each type of the control apparatus 1 in advance.

Processing load amounts for different numbers of pieces of processing data are calculated based on information indicating the type of the analysis program acquired from the embedded database 180 of the above-described control apparatus 1, and the sum of processing load amounts is obtained for different numbers of pieces of processing data, and is stored in the memory of the PC 2.

FIG. 13 shows an example of the relationship between the type of analysis program and the processing load amount (processing time) depending on the number of pieces of data for each type of program, regarding control apparatuses A and B. In this example, in the control apparatus A, assuming that the number of pieces of data is "10", processing times of the functional blocks for analysis FB3 and FB4 are respectively 30 μsec and 40 μsec, and thus the total value is 70 μsec. Similarly, the sum of processing times is obtained for different numbers of pieces of processing data, and is registered in a memory of the PC 2.

Note that FIG. 13 shows an example of the case where functional blocks for analysis are extracted in Working Example 1 of (1-1) Extraction of Analysis Processing Program, but if analysis programs are extracted in Working Example 2 of (1-1) Extraction of Analysis Processing Program, their relationship to the processing load amount is calculated for each program.

In addition, the calculation of a processing load amount for different numbers of pieces of data is not limited to creating, in advance, a data table indicating the relationship between the type of analysis program and the processing time that is based on the number of pieces of data for each type of program as described above, and, for example, can be performed through simulation in which, using a relational expression created by obtaining a processing time required for actual analysis when the number of pieces of data is changed for each analysis program, processing times of the control apparatus 1 for different numbers of pieces of data in the obtained processing time are calculated.

(1-4-2) Calculation of Margin of Processing and Creation of Margin Graph

A margin of processing is calculated as a time within a control cycle that remains (remaining time) when the processor 11a of the control apparatus 1 executes tasks (a first execution task realized by execution of an analysis processing program and a second execution task realized by execution of a control program a manufacturing device) that have been set to be processed within the control cycle, or the ratio of the remaining time. A margin for different numbers of pieces of data is calculated from the processing load amounts (processing time) for different numbers of pieces of data obtained in the processing in (1-4-1) above and the control load amount of the control program acquired from the embedded database 180 of the control apparatus 1.

Subsequently, in step S13, the margin calculation program 2023 generates information for displaying the calculation result of the margin of processing as a margin graph.

Figure 10:
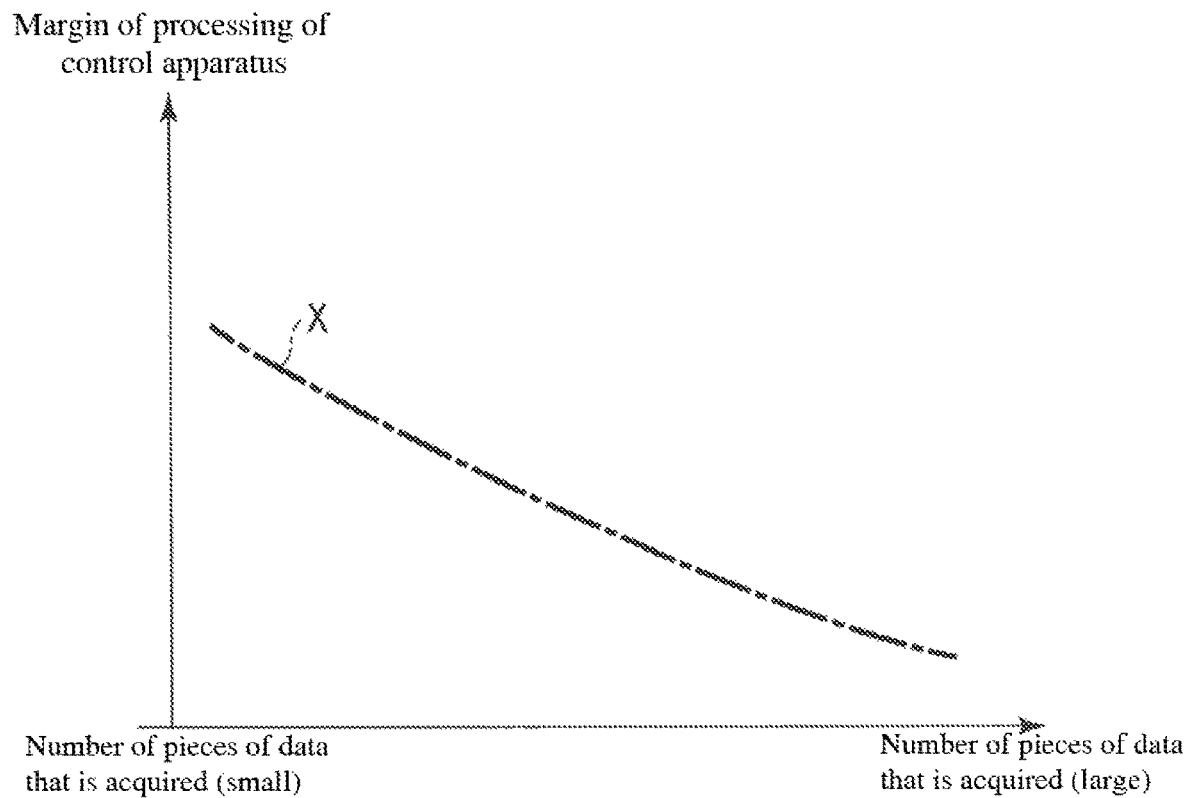
FIG. 10 is a diagram illustrating an example of a graph that indicates change in a margin of processing of a control apparatus for the number of pieces of analysis data, and is created in abnormality detection parameter setting processing, such as in FIG. 9.

Next, in step S14, the margin calculation program 2023 passes, to the visualization unit 203, the generated display data of the margin graph. For example, the visualization unit 203 arranges the number of pieces of analysis data along the horizontal axis and arranges the calculated margin of processing of the control apparatus 1 along the vertical axis in accordance with the display data of the margin graph generated by the margin calculation program 2023, and displays the margin graph indicating change in margin of processing for the number of pieces of analysis data, on the display screen through the GUI 210. X in FIG. 10 indicates an example of the display result.

(1-5) Calculation of Data Analysis Accuracy and Generation of Trade-Off Graph

A configuration may be adopted in which, instead of creating only a margin graph, accuracy of a monitoring result for the number of pieces of analysis data is calculated such that both the accuracy of the monitoring result and the margin can be displayed as a graph. A working example at this time is described in the following. First, in step S15, the data mining tool 200 calculates accuracy (data analysis accuracy) of a monitoring result for the number of pieces of analysis data when the control apparatus 1 executes an analysis processing program, based on information indicating the above-described monitoring result imported from the control apparatus 1, under the control of the analysis accuracy calculation program 2024 of the analysis/control performance comparison unit 2021.

Data analysis accuracy is defined as a probability that a purpose of analysis defined by the user will be achieved when the control unit 11 of the control apparatus 1 executes an analysis processing program, for example. The probability that a purpose of analysis defined by the user will be achieved may be represented as an erroneous detection rate (rate of false positives), for example. Accordingly, a state where "it is possible to perfectly determine that data defined to be normal in advance is normal, and data defined to be abnormal is abnormal" is defined to be a state where the analysis accuracy is high, and conversely, the state where "normality is misread as abnormality, or abnormality is misread as normality" due to the number of pieces of data prepared for analysis being small, or the like, is defined to be a state where the analysis accuracy is low.

Subsequently, in step S16, the analysis accuracy calculation program 2024 generates display data of a graph (trade-off graph) indicating the relationship between the above-described margin of processing calculated by the margin calculation program 2023 and the above-described data analysis accuracy. Generation of a trade-off graph can be performed through simulation in which the number of pieces of data that is acquired is changed from a minimum value to a maximum value that have been set in advance, and a margin of processing of the control apparatus 1 and analysis accuracy for each value between the minimum value and the maximum value are calculated, for example.

Next, in step S17, the analysis accuracy calculation program 2024 passes the generated display data of a trade-off graph to the visualization unit 203. As a result, the visualization unit 203 displays, on the screen of the display device through the GUI 210, a trade-off graph that indicates changes in margin of processing and data analysis accuracy for the number of pieces of analysis data, and in which the number of pieces of analysis data is arranged along the horizontal axis and margin of processing and data analysis accuracy are arranged along the vertical axis in accordance with the display data of the trade-off graph. for example.

Figure 11:
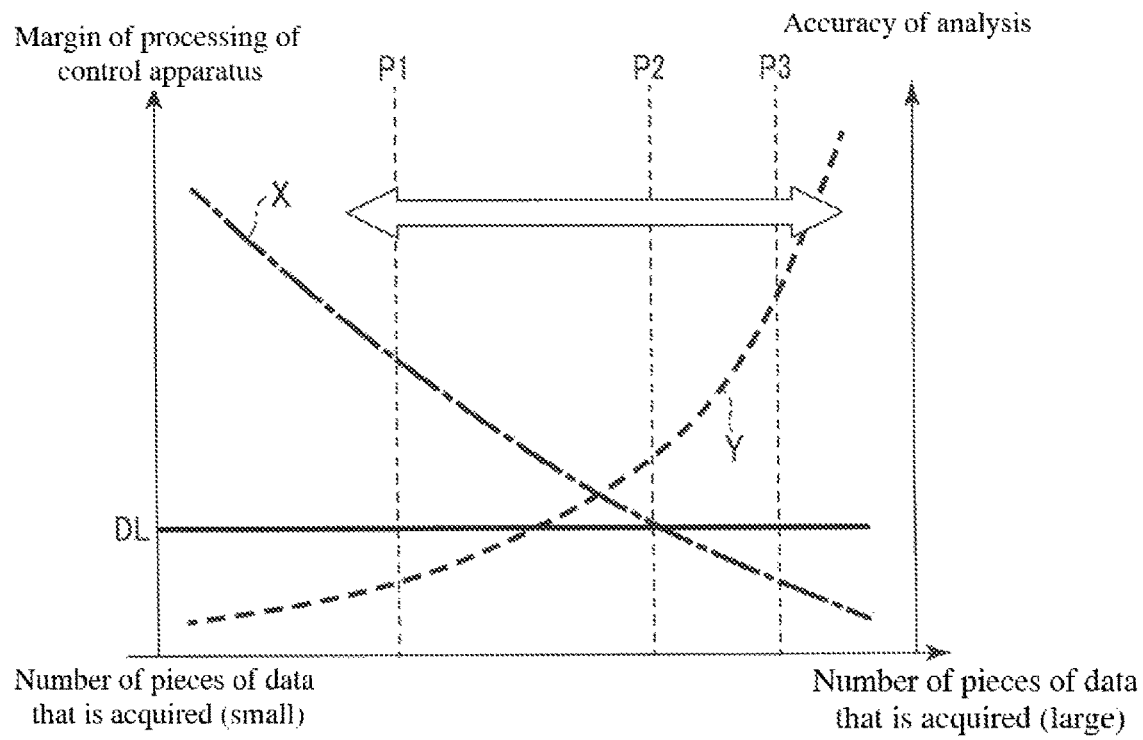
FIG. 11 is a diagram illustrating an example of a trade-off graph that indicates the relationship between a margin of processing of a control apparatus for the number of pieces of analysis data and data analysis accuracy, and is created in abnormality detection parameter setting processing, such as in FIG. 9.

FIG. 11 shows an example of the above-described trade-off graph that has been generated, in which X denotes margin of processing and Y denotes analysis accuracy. In addition, DL denotes a value that can be allowed for a margin of processing that is based on the number of pieces of analysis data when the control apparatus 1 executes an analysis processing program. Note that DL may be set to a value designated in advance at the time of shipment, or may be appropriately set in accordance with a margin requested by the user.

Note that a configuration may also be adopted in which a memory table that stores information indicating the degree of a control load of the control apparatus 1 in association with the number or the like of the model or type of the control apparatus 1 is provided in the storage unit, and, by the operator designating and inputting the type number of the control apparatus 1, information indicating the degree of control load of the control apparatus 1 is selected and designated.

Furthermore, the PC 2 acquires information indicating the processing load amount of the processor 11a when analysis processing programs are executed from a plurality of control apparatuses 1 of different models. A configuration may be adopted in which the above-described processing for calculating a margin and generating a margin graph and processing for calculating data analysis accuracy and generating a trade-off graph are performed for all of the combinations of the control apparatuses 1 and information indicating the processing load amounts of the analysis processing programs, and margin graphs and trade-off graphs are generated respectively. In this case, only graphs that have room for consideration are selected from all of the margin graphs and trade-off graphs that have been generated, based on a condition that has been set in advance, and display data for the selected graphs is displayed on the screen of the display device. With such a configuration, the operator can select a combination of a control apparatus 1 and an analysis program that is optimum for or available to a manufacturing system that is to be configured.

(2) Setting of Abnormality Detection Parameter

The PC 2 executes processing for setting an abnormality detection parameter for the control apparatus 1 by referencing data of the above-described trade-off graph, under the control of the data mining tool 200, as follows.

The operator inputs an operation condition of the control apparatus 1 and an abnormality detection parameter determination mode to the PC 2 using the input device of the PC 2. There are three types of operation conditions of the control apparatus 1, for example, "control task prioritized", "analysis task prioritized", and "control task/analysis task equalized", and degrees of "control task prioritized" and "analysis task prioritized" are designated. In addition, the abnormality detection parameter determination mode is for designating a method for setting an abnormality detection parameter, and one of "manual setting", "recommended setting", and "completely automated setting" is designated. Note that, in the case of designating "manual setting", designation of an operation condition is not necessarily required.

In step S18, the PC 2 imports the above-described operation condition that has been input by the operator through the input device, under the control of the data mining tool 200, and stores the operation condition in the storage unit. Subsequently, in step S19, it is determined which mode has been input as the abnormality detection parameter determination mode, and the following setting processing is selectively executed according to the determination result.

(2-1) Manual Setting

Figure 12:
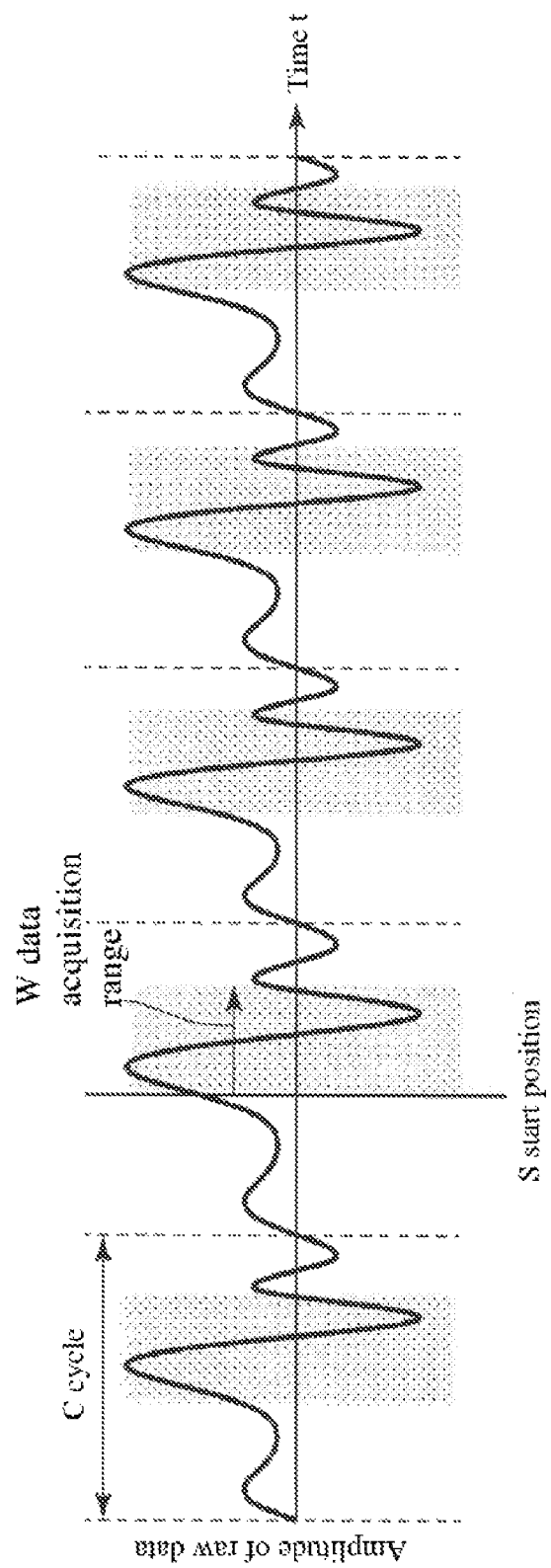
FIG. 12 is a diagram illustrating an example of parameters of an analysis data selection rule that are set in abnormality detection parameter setting processing of a PC, such as in FIG. 9.

The operator inputs an abnormality detection parameter to the PC 2 through a manual operation. For example, the operator references a displayed trade-off graph, and first determines the number of pieces of data that is acquired. Subsequently, the operator designates and inputs a selection rule that is based on this number of pieces of data that is acquired. As described above, a selection rule is a time window indicating an analysis section for collecting analysis data, and, for example, as shown in FIG. 12, is represented by a measured length of time C of a cycle of raw data (waveform data), a start position S at which collection is started, and an acquisition range W for collection. The length of time C of the cycle is designated by a time, for example. The start position S is designated by a count value of the number of samplings from the start point of the cycle, or an absolute time. The data acquisition range W is designated by a time, a data amount, or behavior of raw data values.

Note that, regarding the above-described designation and input of a selection rule, a configuration is preferably adopted in which information acquired by the control apparatus 1 performing primary analysis on behaviour of a variable detected from raw data corresponding to a variable of a monitoring target, in other words, periodicity and behavior is acquired by the PC 2 from the control apparatus 1, and displayed on the screen of the display device through the GUI 210, and the operator references this displayed primary analysis information, and designates and inputs an analysis section by performing an operation with the mouse or the like.

In addition, the operator inputs a normality/abnormality determination rule to the PC 2. For the determination rule, a threshold value for deciding between normal value and abnormal value is designated.

In step S20, in the PC 2, an abnormality detection parameter setting unit 2022 of the data mining tool 200 imports, from the GUI 210, the above-described selection rule and determination rule that have been input by the operator on the input device, and stores the selection rule and determination rule in a rule storage region in the storage unit. Subsequently in step S24, using the abnormality monitoring parameter setting tool 220, the stored rules are sent as abnormality detection parameters to the control apparatus 1, for example, as shown in FIG. 4, and are set in the variable managing program 120.

(2-2) Setting Using Recommended Value

In the case where a "recommended setting" mode is designated as the abnormality detection parameter determination mode, the data mining unit 202 of the PC 2 calculates recommended values of the selection rule, first in step S21, according to the data of the trade-off graph calculated in the above step S16 (including information indicating the deadline DL) and the operation condition of the control apparatus 1 designated in the above step S18.

For example, if "control task prioritized" is designated as an operation condition of the control apparatus 1, the number of pieces of data that is acquired corresponding to P1 shown in FIG. 11 is selected, for example. Recommended values for the parameter values of the selection rule, in other words, the length of time C of the cycle of raw data (waveform data), the start position S at which collection is started, and the acquisition range W for collection are then set according to this selected number of pieces of data that is acquired.

On the other hand, if "analysis task prioritized" is designated as an operation condition of the control apparatus 1, the number of pieces of data that is acquired corresponding to P2 shown in FIG. 11 is selected, for example, and recommended values for the parameter values of the selection rule, in other words, the length of time C of the cycle of raw data (waveform data), the start position S at which collection is started, and the acquisition range W for collection are set according to this selected number of pieces of data that is acquired.

In addition, if "control task/analysis task equalized" is designated as an operation condition of the control apparatus 1, the number of pieces of data that is acquired corresponding to the intersection between a curve X indicating a margin of processing of the control apparatus 1 and a curve Y indicating analysis accuracy may be selected, for example. Recommended values for the parameter values of the selection rule, in other words, the length of time C of the cycle of raw data (waveform data), the start position S at which collection is started, and the acquisition range W for collection are then set according to this selected number of pieces of data that is acquired.

The data mining unit 202 then displays the recommended values for the parameters of the selection rule that have been set as described above, on the screen of the display device through the GUI 210.

Assume that the operator designated and input a desired value out of the displayed recommended values of the selection rule through the input device in this state. The data mining unit 202 then imports the designated recommended value in step S23, and stores the recommended value in the storage unit. Subsequently in step S24, the PC 2 transmits the stored selection rule as an abnormality detection parameter to the control apparatus 1 along with the determination rule separately designated and input by the operator, using the abnormality monitoring parameter setting tool 220, and sets the selection rule in the variable managing program 120.

(2-3) Fully Automated Setting

In the case where the "fully automated setting" mode is designated as the abnormality detection parameter determination mode, the data mining unit 202 of the PC 2 calculates, in step S22, optimum values of the selection rule based on the data of the trade-off graph (including information indicating the deadline DL) calculated in the above step S16 and the operation condition of the control apparatus 1 designated in the above step S18, and stores these calculated optimum values as determined values of the parameters of the selection rule in the storage unit. Note that these optimum values of the selection rule can also be calculated using a technique similar to that in the above-described case of calculating "recommended values".

Subsequently, in step S24, the PC 2 transmits the stored selection rule as an abnormality detection parameter to the control apparatus 1, along with the determination rule that has been separately designated and input by the operator, using the abnormality monitoring parameter setting tool 220, and sets the abnormality detection parameter in the variable managing program 120.

(2-4) Change of Analysis Task of Control Apparatus 1

Assume that the operator selected the number of pieces of data that is acquired P3 such that a margin of processing of the control apparatus 1 is lower than the deadline DL, for example, as shown in FIG. 11, with the highest priority given to analysis accuracy. If a selection rule corresponding to this number P3 of pieces of data that is acquired is set in the control apparatus 1 as is, an adverse effect such as a processing delay occurs in execution of a control task performed by the control apparatus 1.

In view of this, in this case, the PC 2 displays a message for rejecting the selected and designated number of pieces of data that is acquired P3, on the screen of the display device, or changes the load of the analysis task of the control apparatus 1.

For example, the data mining tool 200 of the PC 2 reselects an analysis processing algorithm that requires a smaller analysis processing amount, from the memory table of analysis algorithm information of the storage unit. A margin graph or a trade-off graph in the case where this reselected analysis algorithm is then used is generated, and this margin graph or trade-off graph that has been generated is displayed on the display screen through the GUI 210. In addition, along with that, the data mining tool 200 resets the selection rule based on data of the regenerated margin graph or trade-off graph, and sets the selection rule in the control apparatus 1.

By adopting such a configuration, it is possible to automatically set an abnormality detection rule that prioritizes analysis accuracy within the range in which the control task of the control apparatus 1 does not fall below the deadline DL.

(3) Processing after Operation of Control Apparatus 1 is Started (3-1) Monitoring During an operation of a manufacturing device, the control apparatus 1 acquires, through the input program 140, raw data corresponding to variables of a monitoring target that are measured by the sensors 7 and 8. Processing for generating a characteristic amount of the above-described raw data from the raw data is then executed under the control of the characteristic amount generating program 116 as follows.

Specifically, the characteristic amount generating program 116 first imports the abnormality detection parameters 123 from the variable managing program 120, and, in accordance with a selection rule of analysis data included in the abnormality detection parameters 123, selectively collects, from the above-described raw data (waveform data), data in a time window designated by the above-described selection rule, in other words, a section (a section displayed in a shaded manner in FIG. 12) represented by the length of time C of the cycle, the start position S for collection, and the data acquisition range W that are shown in FIG. 12. As a result, compared with the case where all of the sections of the raw data are collected as a monitoring target, the number of pieces of analysis data that is acquired is limited, and the influence on the control task of the control apparatus 1 is suppressed.

Next, the characteristic amount generating program 116 calculates the average value or the maximum value of the analysis data in the section that has been collected, in accordance with a characteristic amount generation rule that has been set in advance, and stores this calculated average value or maximum value as a characteristic amount of the above-described raw data, in the main memory 11*d* in the control apparatus 1.

The abnormality monitoring engine 190 acquires the generated characteristic amount via the abnormality monitoring engine/interface 113. The abnormality detection unit 192 then references the above-described degree-of-abnormality calculation result stored in the embedded database 180, and performs abnormality monitoring processing on the acquired characteristic amount. The abnormality detection unit 192 then stores the monitoring result in the embedded database 180, and generates the event log 193 based on the above-described abnormality monitoring result.

(3-2) Update of Abnormality Detection Parameter

During the operation of the control apparatus 1 that has been described above, the PC 2 periodically acquires load information from the control apparatus 1, and calculates a margin of processing of the control apparatus 1 and data analysis accuracy based on a control load amount and a processing load amount included in this load information. The PC 2 then performs processing for updating the abnormality detection parameter that is set in the control apparatus 1 based on the calculation result and the condition designated by the operator. The updated abnormality detection parameter is notified to the variable managing program 120 of the control apparatus 1.

Note that it is also possible to perform abnormality monitoring of measured data of a monitoring target before or while executing the above-described monitoring operation. Examples of a processing procedure and processing details of such abnormality monitoring will be described below.

(3-3) Collection of Raw Data

First, in a degree-of-abnormality calculation stage, the control apparatus 1 imports, from the sensors 7 and 8, raw data corresponding to the user variables and device variables of a monitoring target that are managed by the variable managing program 120, under the control of the input program 140.

(3-4) Generation of Characteristic Amount

In the characteristic amount generating program 116, the control apparatus 1 generates a characteristic amount from raw data corresponding to the user variables and device variables of a monitoring target that has been received from the sensors 7 and 8. Generation of a characteristic amount at this time is performed in accordance with a characteristic amount generation rule defined by the variable managing program 120 in advance. Accordingly, for example, the average value or maximum value is obtained in accordance with the characteristic amount generation rule that has been set in advance.

(3-5) Abnormality Monitoring of Measured Data of Monitoring Target

In the above-described characteristic amount generating program 116, when characteristic amount of measured data corresponding to the variable of a monitoring target are generated, the abnormality monitoring engine 190 acquires the generated characteristic amount via the abnormality monitoring engine/interface 113. In the degree-of-abnormality calculation unit 191, the abnormality monitoring engine 190 performs abnormality monitoring processing for abnormality detection based on the acquired characteristic amount, and stores the degree-of-abnormality calculation result in the embedded database 180.

The PC 2 acquires the above-described degree-of-abnormality calculation result from the above-described embedded database 180 using the embedded database query program 201 under the control of the data mining tool 200. The data mining unit 202 then determines an abnormality determination rule based on the acquired monitoring result. Subsequently, the PC 2 transmits the determined abnormality determination rule to the control apparatus 1 under the control of the abnormality monitoring parameter setting tool 220. In the variable managing program 120, the control apparatus 1 updates the determination rule included in the abnormality detection parameter to the above-described abnormality determination rule transmitted from the PC 2.

Effects

As described above in detail, in an embodiment, in the control apparatus 1, using the execution task extraction program 301 included in the load information generation program 300, any analysis processing program for executing an execution task that depends on the number of pieces of analysis data is extracted from all of the programs, and the type of the program is acquired. Along with that, using the control load amount calculation program 302, a control load amount of the processor 11a when the control apparatus 1 executes a selected control program is calculated based on a specification corresponding to the model (type) of the control apparatus 1 and the type of the above-described control program. Subsequently, in the PC 2, information indicating the type of the analysis program extracted from the control apparatus 1 and the calculated control load amount are acquired, and processing load amounts for different numbers of pieces of data are calculated for each type of the analysis program. A margin of processing of the control apparatus 1 is then calculated for different numbers of pieces of analysis data based on the calculated processing load amounts and the acquired control load amount. A margin graph indicating the change in the margin for the number of pieces of analysis data that is acquired is then generated based on the calculation result, and is displayed through the GUI 210.

Therefore, according to an embodiment, even if a processing time for different numbers of pieces of processing data differs according to the type of an analysis program, the processing load amount for different numbers of pieces of processing data can be calculated according to the type of the analysis program. In addition, even if the relationship between the type of an analysis program and a processing load amount (processing time) for different numbers of pieces of processing data differs according to the type of the control apparatus 1, a processing load amount that is based on the number of pieces of processing data can be calculated for each type of the analysis program according to the type of the control apparatus 1. Thus, the operator can understand a margin of processing of the control apparatus 1 that is based on the number of pieces of analysis data, for each type of the analysis program, and thereby it is possible to set an abnormality detection parameter of the control apparatus 1 so as to acquire more pieces of analysis data within an allowable margin, and cause the control apparatus 1 to execute analysis processing of the analysis data.

In addition, in an embodiment, analysis accuracy of measured data is further calculated based on data indicating a monitoring result obtained by the control apparatus 1, and a trade-off graph indicating the relationship of change between the above-described margin for the number of pieces of analysis data that is acquired and the above-described data analysis accuracy is generated, and is displayed through the GUI 210.

Therefore, the operator can check the relationship between the margin of processing of the control apparatus 1 and the data analysis accuracy, using the trade-off graph displayed on the PC 2, and, based on this relationship, it is possible to easily set an appropriate abnormality detection parameter for the control apparatus 1 to perform analysis processing for performing abnormality detection of a manufacturing device.

In addition, a mode is provided in which recommended values for parameters of the selection rule are obtained based on the margin of processing and data analysis accuracy of the control apparatus 1 as well as the operation condition of the control apparatus 1 designated by the operator in advance, and are displayed, and the operator can select and designate a desired value from the displayed recommended values. Therefore, the operator can always set an appropriate abnormality detection parameter, which is desirable for operators without high skill.

Furthermore, a fully automated setting mode for calculating an optimum value of abnormality detection parameter based on a margin of processing and data analysis accuracy of the control apparatus 1 as well as a parameter setting condition designated by the operator in advance, and setting the optimum value of abnormality detection parameter in the variable managing program 121 of the control apparatus 1 is also provided. Therefore, by selecting this fully automated setting mode, the operator does not need to perform a setting operation in particular.

Moreover, during a period of an operation of the control apparatus 1 after an abnormality detection parameter is set for the control apparatus 1, processing for calculating a margin of processing and data analysis accuracy of the control apparatus 1 is periodically executed, and an optimum value of abnormality detection parameter that is set for the control apparatus 1 is updated. Therefore, even if a control load amount of the control apparatus 1 or a processing load amount of data analysis processing during an actual operation of the control apparatus 1 are different from simulation values before the operation, it is possible to automatically readjust the abnormality detection parameter. In addition, for example, if, during a period of an operation of the control apparatus 1, the device variables change due to the actuators 5 and 9 being replaced, or the user variables partially changes due to the user program being updated, the abnormality detection parameter can be automatically updated according to these changes.

Other Embodiments

In the above embodiment, an example has been described in which functions of the assistance apparatus are provided in the PC 2. However, the functions of the assistance apparatus may also be provided in the control apparatus 1. In addition, a human machine interface (HMI) may also be used as the assistance apparatus in place of a PC, and the assistance apparatus may also be constituted by a Web server.

In addition, in the above embodiment, an example has been described in which processing for calculating a control load amount of the processing unit by executing a control program and processing for extracting an analysis program from all of the programs are performed in the control apparatus 1. However, each processing described above may also be performed in the PC 2 that functions as the assistance apparatus.

In addition, as an application example, processing for extracting an analysis program and processing for calculating a control load amount that are executed by the industrial control apparatus can be performed by the assistance apparatus. In this case, for example, the PC 2 that functions as the assistance apparatus acquires, from the control apparatus 1, information indicating a list of analysis programs or information indicating the execution history thereof and information indicating the control apparatus 1 and a specification of a control program, and executes, based on these pieces of information, processing for extracting an analysis program, processing for calculating a processing load amount according to the number of pieces of data for each type of the analysis program, and processing for calculating a control load amount using the above-described control program.

Other than that, the type and configuration of the industrial control apparatus, the type and functions of the assistance apparatus, and the like can be modified in various manners and implemented without departing from the gist of the present invention.

In short, the present invention is not limited to the above embodiment, and, at a use stage, constituent elements can be modified and embodied without departing from the gist of the present invention. In addition, various inventions can be formed from appropriate combinations of a plurality of constituent elements disclosed in the above embodiment. For example, several constituent elements may be deleted from all of the constituent elements shown in an embodiment. Furthermore, constituent elements in different embodiments may be combined as appropriate.

A portion or the entirety of the above embodiment can be described as Supplemental Descriptions below, but there is no limitation thereto.

Supplemental Description 1

An industrial control system including:

an industrial control apparatus that causes a common processing unit to execute a first execution task for executing processing for controlling an operation of a control target and a second execution task for executing processing for acquiring analysis data related to the operation of the control target in accordance with an execution rule that has been set in advance and analyzing the operation, and an assistance apparatus that is used with the industrial control apparatus, wherein the industrial control apparatus has a hardware processor and a memory as the processing unit, the industrial control apparatus is configured to cause the hardware processor to:

calculate a control load amount of the processing unit in the first execution task, extract the second execution task from the first and second execution tasks, and acquire a type of the extracted second execution task and the number of pieces of the analysis data, and calculate a processing load amount of the hardware processor in the extracted second execution task, based on the acquired type of the second execution task and number of pieces of the analysis data, the assistance apparatus has a hardware processor and a memory, and the assistance apparatus is configured to cause the hardware processor to:

acquire information indicating the calculated control load amount and processing load amount, from the industrial control apparatus, calculate a processing load amount of the processing unit according to the acquired type of the second execution task for different numbers of pieces of the analysis data, calculate a margin of processing indicating a degree of processing capability that remains when the hardware processor executes the first and second execution tasks, for different numbers of pieces of the analysis data, based on the acquired information indicating the control load amount and processing load amount, and output information indicating the margin of processing calculated for different numbers of pieces of the analysis data, as information that can be displayed.

Supplemental Description 2

An assistance apparatus that is used with an industrial control apparatus that has a function for causing a common processing unit to execute a first execution task for executing processing for controlling an operation of a control target and a second execution task for executing processing for acquiring analysis data related to the operation of the control target in accordance with an execution rule that has been set in advance and analyzing the operation, calculating a control load amount of the processing unit in the first execution task, extracting the second execution task from the first and second execution tasks, and acquiring a type of the extracted second execution task and the number of pieces of the analysis data and calculating a processing load amount of the processing unit in the extracted second execution task, based on the acquired type of the second execution task and number of pieces of the analysis data, the assistance apparatus having a hardware processor and a memory, wherein the hardware processor is configured to:

acquire information indicating the calculated control load amount and processing load amount, from the industrial control apparatus, calculate a processing load amount of the processing unit according to the acquired type of the second execution task for different numbers of pieces of the analysis data, calculate a margin of processing indicating a degree of processing capability that remains when the processing unit executes the first and second execution tasks, for different numbers of pieces of the analysis data, based on the acquired information indicating the control load amount and processing load amount, and output information indicating the margin of processing calculated for different numbers of pieces of the analysis data, as information that can be displayed.

Supplemental Description 3

A control assist method that is executed by:

an industrial control apparatus that causes a common processing unit that has at least one hardware processor and memory to execute a first execution task for executing processing for controlling an operation of a control target and a second execution task for executing processing for acquiring analysis data related to the operation of the control target and analyzing the operation, in accordance with an execution rule that has been set in advance, and an assistance apparatus that is used with the industrial control apparatus, and has at least one hardware processor and memory, the control assist method including;

a step of the industrial control apparatus calculating a control load amount of the processing unit in the first execution task, using the at least one hardware processor and memory, a step of the industrial control apparatus extracting the second execution task from the first and second execution tasks using the at least one hardware processor and memory, a step of the industrial control apparatus acquiring a type of the extracted second execution task and the number of pieces of the analysis data, and calculating a processing load amount of the processing unit in the extracted second execution task, based on the acquired type of the second execution task and number of pieces of the analysis data, using the at least one hardware processor and memory, a step of the assistance apparatus acquiring information indicating the calculated control load amount and processing load amount, from the industrial control apparatus, using the at least one hardware processor and memory, a step of the assistance apparatus calculating a processing load amount of the processing unit according to the acquired type of the second execution task for different numbers of pieces of the analysis data, using the at least one hardware processor and memory, a step of the assistance apparatus calculating a margin of processing indicating a degree of processing capability that remains when the processing unit executes the first and second execution tasks, for different numbers of pieces of the analysis data, based on the acquired information indicating the control load amount and processing load amount, using the at least one hardware processor and memory, and a step of the assistance apparatus outputting information indicating the margin of processing calculated for different numbers of pieces of the analysis data, as information that can be displayed, using the at least one hardware processor and memory.

The invention claimed is:

1. An industrial control system comprising:
an industrial control apparatus comprising a processor configured with a program to perform operations comprising:
operation as a common processing unit configured to execute a first execution task for controlling an operation of a control target and a second execution task for acquiring analysis data related to the operation of the control target and analyzing the operation of the control target,
operation as a first calculation unit configured to calculate a control load amount of the common processing unit incurred by executing the first execution task,
operation as an extraction unit configured to extract the second execution task from the first and second execution tasks;
operation as an acquisition unit configured to acquire information indicating the calculated control load amount and a type of the extracted second execution task,
operation as a second calculation unit configured to calculate a processing load amount of the common processing unit for different numbers of pieces of the analysis data according to the acquired type of the second execution task,
operation as a margin calculation unit configured to calculate, based on information indicating the acquired control load amount and the calculated processing load amount, for each of the different numbers of pieces of the analysis data, a margin of processing that indicates a degree of processing capability that remains when the common processing unit executes the first and second execution tasks, and operation as an output control unit configured to output information indicating the calculated margin of processing.

2. The industrial control system according to claim 1, wherein the processor is configured with the program to perform operations such that operation as the extraction unit comprises, in a case where at least a portion of a plurality of programs prepared for executing the first and second execution tasks is coded in functional blocks, extracting the second execution task by determining whether a program for executing the first and second execution tasks corresponds to a predetermined functional block.

3. The industrial control system according to claim 1, wherein the processor is configured with the program to perform operations such that operation as the extraction unit comprises, in a case where a plurality of programs prepared for executing the first and second execution tasks are stored separately in a first storage region associated with the first execution task and a second storage region associated with the second execution task, extracting the second execution task by determining whether a program for executing the execution tasks is stored in the first or second storage region.

4. An assistance apparatus to be used with an industrial control apparatus that performs processing for causing a common processing unit to execute a first execution task for controlling an operation of a control target and a second execution task for acquiring analysis data related to the operation of the control target, and analyzing the operation, in accordance with an execution rule set in advance, processing for calculating a control load amount of the common processing unit incurred by executing the first execution task, and processing for extracting the second execution task from the first and second execution tasks, the assistance apparatus comprising:
a processor configured with a program to perform operations comprising:
operation as an acquisition unit configured to acquire, from the industrial control apparatus, information indicating the calculated control load amount and a type of the extracted second execution task;
operation as a calculation unit configured to calculate a processing load amount of the common processing unit according to the acquired type of the second execution task for different numbers of pieces of the analysis data;
operation as a margin calculation unit configured to calculate, based on information indicating the acquired control load amount and the calculated processing load amount, for each of the different numbers of pieces of the analysis data, a margin of processing that indicates a degree of processing capability that remains when the common processing unit executes the first and second execution tasks; and
operation as an output control unit configured to output information indicating the calculated margin.

5. The assistance apparatus according to claim 4, wherein the processor is configured with the program to perform operations such that operation as the calculation unit comprises calculating a processing load amount of the second execution task for different numbers of pieces of analysis data according to each type of the extracted second execution task, from the number of pieces of the analysis data and a processing time for different numbers of pieces of the analysis data.

6. The assistance apparatus according to claim 4, wherein the processor is configured with the program to perform operations further comprising:
- operation as a relationship information generation unit configured to generate relationship information indicating, as an arithmetic function of the number of pieces of analysis data acquired in the second execution task, a relationship between the calculated margin of processing and an accuracy indicating a probability that a purpose of the second execution task is achieved when the common processing unit executes the second execution task, and
- wherein the processor is configured with the program to perform operations such that operation as the output control unit comprises outputting the generated relationship information as information that can be displayed.

7. The assistance apparatus according to claim 6, wherein the processor is configured with the program such that operation as the relationship information generation unit comprises:
- operation as a first memory table that stores information indicating a margin of processing in each of a plurality of industrial control apparatuses of different models,
- operation as a second memory table that stores information indicating a processing load amount in each of a plurality of second execution tasks having different processing algorithms, and
- operation as a generation processing unit configured to generate the relationship information for all combinations of the plurality of industrial control apparatuses and the plurality of second execution tasks, based on information stored in the first and second memory tables, and
- the processor is configured with the program to perform operations such that operation as the output control unit comprises selecting relationship information that satisfies a condition set in advance, from the generated plurality of pieces of relationship information, and outputting the selected relationship information as information that can be displayed.

8. The assistance apparatus according to claim 6, wherein the processor is configured with the program to perform operations further comprising:
- operation as a recommended value generation unit configured to generate a recommended value of the execution rule of the second execution task corresponding to an operation condition indicating degrees of priority of the first execution task and the second execution task, based on the generated relationship information and the operation condition,
- wherein the processor is configured with the program to perform operations such that operation as the output control unit comprises outputting the generated recommended value of the execution rule as information that can be displayed.

9. The assistance apparatus according to claim 6, wherein the processor is configured with the program to perform operations further comprising:
- operation as a determined value generation unit configured to generate a determined value of the execution rule of the second execution task based on the generated relationship information; and
- operation as an execution rule setting unit configured to set the determined value of the execution rule generated by the determined value generation unit, as the execution rule of the second execution task executed by the industrial control apparatus.

10. The assistance apparatus according to claim 9, wherein the processor is configured with the program such that
- operation as the determined value generation unit comprises executing processing for regenerating the determined value of the execution rule of the second execution task based on the generated relationship information, and
- operation as the execution rule setting unit comprises executing processing for updating the execution rule of the second execution task executed by the industrial control apparatus, to the determined value of the execution rule regenerated by the determined value generation unit.

11. The assistance apparatus according to claim 4, wherein the execution rule includes information indicating a length of time of a cycle of data to be processed in the second execution task, information indicating a start position of a section to be processed of the data to be processed, and information indicating a range of the section to be processed.

12. A control assist method executed by an industrial control apparatus that causes a common processing unit to execute a first execution task for executing processing for controlling an operation of a control target and a second execution task for executing processing for acquiring analysis data related to the operation of the control target, and analyzing the operation, and that comprises a processor and a memory, and an assistance apparatus used with the industrial control apparatus, and that comprises a processor and memory, the control assist method comprising:
- calculating, by the industrial control apparatus, a control load amount of the common processing unit incurred by executing the first execution task;
- extracting, by the industrial control apparatus, the second execution task from the first and second execution tasks;
- acquiring, by the assistance apparatus, from the industrial control apparatus, information indicating the calculated control load amount and a type of the extracted second execution task;
- calculating, by the assistance apparatus, a processing load amount of the common processing unit for different numbers of pieces of the analysis data according to the acquired type of the second execution task;
- calculating, by the assistance apparatus, based on information indicating the acquired control load amount and the calculated processing load amount, for each of the different numbers of pieces of the analysis data, a margin of processing that indicates a degree of processing capability that remains when the common processing unit executes the first and second execution tasks; and
- outputting, by the assistance apparatus, information indicating the calculated margin of processing for different numbers of pieces of the analysis data.

13. A non-transitory computer-readable recording medium storing a program, which, when read and executed, causes a processor to perform operations of the industrial control system according to claim 1.

14. A non-transitory computer-readable recording medium storing a program, which, when read and executed, causes a processor to perform operations of the assistance apparatus according to claim 4.

\* \* \* \* \*